US009736865B2

(12) United States Patent
Oh et al.

(10) Patent No.: US 9,736,865 B2
(45) Date of Patent: Aug. 15, 2017

(54) RANDOM ACCESS METHOD AND APPARATUS IN WIRELESS COMMUNICATION SYSTEM

(75) Inventors: Seong-Keun Oh, Yongin-si (KR); Min Lee, Suwon-si (KR)

(73) Assignee: AJOU UNIVERSITY INDUSTRY-ACADEMIC COOPERATION FOUNDATION, Suwon-si (KR)

(*) Notice: Subject to any disclaimer, the term of this patent is extended or adjusted under 35 U.S.C. 154(b) by 772 days.

(21) Appl. No.: 13/695,576

(22) PCT Filed: Apr. 22, 2011

(86) PCT No.: PCT/KR2011/002950
§ 371 (c)(1),
(2), (4) Date: Oct. 31, 2012

(87) PCT Pub. No.: WO2011/136508
PCT Pub. Date: Nov. 3, 2011

(65) Prior Publication Data
US 2013/0044657 A1   Feb. 21, 2013

(30) Foreign Application Priority Data

Apr. 27, 2010 (KR) .................. 10-2010-0039227
Mar. 25, 2011 (KR) .................. 10-2011-0027231

(51) Int. Cl.
*H04W 74/08* (2009.01)
(52) U.S. Cl.
CPC .............................. *H04W 74/0875* (2013.01)
(58) Field of Classification Search
CPC .. H04W 74/00; H04W 74/08; H04W 74/0875
(Continued)

(56) References Cited

U.S. PATENT DOCUMENTS 6,400,695 B1 * 6/2002 Chuah ............... H04W 74/0875
                                                    370/310
6,594,240 B1 * 7/2003 Chuah ................. H04W 74/085
                                                    370/328
(Continued)

FOREIGN PATENT DOCUMENTS

JP         2002-16979 A       1/2002
KR    10-2001-0110188 A      12/2001
(Continued)

OTHER PUBLICATIONS

European Search Report dated Dec. 5, 2016, issued by the European Patent Office in corresponding application 11775213.9.
(Continued)

*Primary Examiner* — Melvin Marcelo
*Assistant Examiner* — Natali N Pascual Peguero
(74) *Attorney, Agent, or Firm* — Stein IP, LLC

(57) ABSTRACT

Disclosed is a method of performing random access by a User Equipment (UE) in a wireless communication system. The method includes generating at least two random access signals with their own priorities, and transmitting the at least two random access signals with their own priorities. The random access method may include transmitting at least two random access signals to at least two target communication nodes. Further, the random access method may include transmitting at least one random access signal, and selecting at least one of at least two random access response signals received in response to the at least one random access signal and performing random access control by using the selected random access response signals.

18 Claims, 25 Drawing Sheets

(58) Field of Classification Search
USPC .......................................... 370/310, 342, 437
See application file for complete search history.

(56) References Cited

U.S. PATENT DOCUMENTS

| | | | |
|---|---|---|---|
| 7,061,890 | B2 | 6/2006 | Kim et al. |
| 7,103,060 | B2* | 9/2006 | Kornprobst et al. ......... 370/437 |
| 7,733,897 | B2 | 6/2010 | Ko et al. |
| 8,665,857 | B2* | 3/2014 | Meylan ........................ 370/349 |
| 2001/0026539 | A1 | 10/2001 | Kornprobst et al. ......... 370/329 |
| 2003/0095528 | A1* | 5/2003 | Halton et al. ................. 370/342 |
| 2004/0032877 | A1* | 2/2004 | Chuah ............... H04W 74/0875 370/444 |
| 2006/0111104 | A1 | 5/2006 | Hyslop ...................... 455/435.1 |
| 2006/0233280 | A1* | 10/2006 | Tynderfeldt ............. H04B 7/04 375/299 |
| 2006/0252367 | A1* | 11/2006 | Haartsen ............. H04B 7/2606 455/11.1 |
| 2007/0265016 | A1* | 11/2007 | Kahtava et al. ........... 455/452.2 |
| 2008/0019311 | A1* | 1/2008 | Kornprobst ......... H04W 74/085 370/329 |
| 2009/0156194 | A1 | 6/2009 | Meylan ..................... 455/422.1 |
| 2009/0238141 | A1* | 9/2009 | Damnjanovic ... H04W 36/0055 370/331 |
| 2009/0253426 | A1* | 10/2009 | Qiu et al. .................... 455/426.1 |
| 2010/0074130 | A1 | 3/2010 | Bertrand et al. |
| 2010/0232364 | A1* | 9/2010 | Hsu ..................... H04W 74/085 370/328 |
| 2011/0110258 | A1* | 5/2011 | Ishii et al. .................... 370/252 |
| 2012/0140740 | A1 | 6/2012 | Iwamura et al. ............. 370/331 |

FOREIGN PATENT DOCUMENTS

| | | |
|---|---|---|
| KR | 10-2006-0121449 A | 11/2006 |
| KR | 10-2010-0103609 A | 9/2010 |
| WO | EP 0 994 603 A2 | 5/1999 |
| WO | WO 2010/150662 A1 | 12/2010 |

OTHER PUBLICATIONS

XP 050101449,3 GPP DRAFT; R1-060512, vol. RAN WG1 Meeting #44.
Extended European Search Report dated Mar. 20, 2017, issued by the European Patent Office in corresponding application EP 11775213.9.
Korean Office Action dated Mar. 22, 2017, issued by the Korean Intellectual Property Office in corresponding application KR 10-2011-0027231.

* cited by examiner

| 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|----|----|----|----|----|----|----|----|----|----|----|
| FIRST RANDOM ACCESS CHANNEL GROUP ||||||||  SECOND RANDOM ACCESS CHANNEL GROUP ||||||| THIRD RANDOM ACCESS CHANNEL GROUP |||||

FIG.2A

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|
| | | | | | | | | | | THIRD RANDOM ACCESS CHANNEL GROUP |||||
| | | | | | SECOND RANDOM ACCESS CHANNEL GROUP ||||||||||
| FIRST RANDOM ACCESS CHANNEL GROUP ||||||||||||||

FIG.2B

RANDOM ACCESS METHOD AND APPARATUS IN WIRELESS COMMUNICATION SYSTEM

PRIORITY

This application is a National Stage application under 35 U.S.C. §371 of an International application filed on Apr. 22, 2011 and assigned application No. PCT/KR2011/002950 and claims the benefit under 35 U.S.C. §119(a) of a Korean patent application filed on Apr. 27, 2010 in the Korean Intellectual Property Office and assigned Serial No. 10-2010-0039227 and a Korean patent application filed on Mar. 25, 2011 in the Korean Intellectual Property Office and assigned Serial No. 10-2011-0027231, the entire disclosure of each of which is hereby incorporated by reference.

BACKGROUND OF THE INVENTION

1. Field of the Invention

The present invention relates to a random access method and apparatus in a wireless communication system.

2. Description of the Related Art

In a wireless communication system, research has been conducted to provide User Equipments (UEs) with high-speed services having various Qualities of Service (QoS). Representative examples of such a wireless communication system include a Long Term Evolution (LTE) wireless communication system, a wireless communication system using the $3^{rd}$ Generation Partnership Project 2 (3GPP2) specification based on a Code Division Multiple Access (CDMA) scheme (herein after referred to as a "3 GPP2 wireless communication system"), a wireless communication system using the $3^{rd}$ Generation Partnership Project (3GPP) specification based on a Wideband Code Division Multiple Access (WCDMA) scheme (herein after referred to as a "3GPP wireless communication system"), a Worldwide interoperability for Microwave Access (WiMAX) wireless communication system using the WiMAX forum network working group standard specification, an Institute of Electrical and Electronics Engineers (IEEE) 802.16m communication system, and the like.

A related-art random access method corresponds to a contention-based random access method in which a UE contends with other UEs for a Random Access CHannel (RACH) randomly assigned according to the RACH assignment scheme. When the contention-based random access method is used, random access is performed using one random access channel for each UE.

However, in the case of the related-art contention-based random access method using one random access channel, all UEs use only one random access channel respectively, and therefore the probability of network access success is the same for all the UEs.

As a result, since even a UE requiring relatively fast network access, such as a UE requesting an emergency call or a UE for which a handover is ongoing, must perform random access with the same probability of success, it is difficult to provide satisfactory service.

Accordingly, to address this problem, a contention-free random access method has been proposed in which a UE uses a random access channel predefined between the UE and a network to be accessed or a random access channel previously assigned to the UE through a connection establishment with a network to be accessed.

However, the contention-free random access method causes a problem in that fast network access cannot be provided because resource use is inefficient, a service delay occurs, and the like.

Therefore, there is a need for a new random access method that can significantly shorten a service connection delay or an initial service connection time through fast random access, and can also maintain efficiency of resource use by using one random access channel for a UE, which is being provided with a low-priority service, as in the related-art random access method.

SUMMARY OF THE INVENTION

Aspects of the present invention are to address at least the above-mentioned and/or disadvantages and to provide at least the advantages described below. Accordingly, an aspect of the present invention is to provide a random access method and apparatus in a wireless communication system.

Another aspect of the present invention is to provide a random access method and apparatus in a wireless communication system, in which a User Equipment (UE) generates at least two random access signals with their own priorities and transmits the generated at least two random access signals with their own priorities to at least one target communication node.

Another aspect of the present invention is to provide a random access method and apparatus in a wireless communication system, in which a UE transmits at least two random access signals to at least two target communication nodes.

Another aspect of the present invention is to provide a random access method and apparatus in a wireless communication system, in which a UE transmits at least one random access signal, selects some or all of at least two random access response signals received in response to the at least one random access signal, and performs random access control by using the selected random access response signals.

Another aspect of the present invention is to provide a random access method and apparatus in a wireless communication system, in which a UE includes a multiple node random access controller capable of controlling transmission of at least one random access signal to at least two target communication nodes.

In accordance with an aspect of the present invention, a method of performing random access by UE in a wireless communication system is provided. The method includes generating at least two random access signals with their own priorities, and transmitting the at least two random access signals with their own priorities.

In accordance with another aspect of the present invention, a method of performing random access by a UE in a wireless communication system is provided. The method includes transmitting at least two random access signals to at least two target communication nodes.

In accordance with yet another aspect of the present invention, a method of performing random access by a UE in a wireless communication system is provided. The method includes transmitting at least one random access signal, and selecting at least two of at least two random access response signals received in response to the at least one random access signal and performing random access control by using the selected random access response signals.

In accordance with still yet another aspect of the present invention an apparatus for performing random access by a UE in a wireless communication system is provided. The apparatus includes a multiple node random access controller for controlling the UE to transmit at least one random access signal to at least two target communication nodes.

In accordance with still yet another aspect of the present invention, an apparatus for performing random access by a UE in a wireless communication system is provided. The apparatus includes a multiple node random access controller to control the UE to generate at least two random access signals with their own priorities and to transmit the at least two random access signals with their own priorities.

In accordance with still yet another aspect of the present invention, an apparatus for performing random access by a UE in a wireless communication system is provided. The apparatus includes a multiple node random access controller to control the UE to transmit at least two random access signals to at least two target communication nodes.

In accordance with still yet another aspect of the present invention, an apparatus for performing random access by a UE in a wireless communication system is provided. The apparatus includes a multiple node random access controller to control the UE to transmit at least one random access signal, to select at least two of at least two random access response signals received in response to the at least one random access signal, and to perform random access control by using the selected random access response signals.

Other aspects, advantages, and salient features of the invention will become apparent to those skilled in the art from the following detailed description, which, taken in conjunction with the annexed drawings, discloses exemplary embodiments of the invention.

According to the random access method and apparatus of exemplary embodiments of the present invention as described above, the following effects can be obtained:

First, since a UE uses a plurality of random access signals, the probability of random access success can be improved, and thus a service connection delay or an initial service connection time can be significantly shortened through fast random access when the UE performs a handover or requests a high-priority service such as an emergency call.

Further, since a UE performs random access to a plurality of Radio Access Technologies (RATs) and/or communication nodes, multiple access for multihoming, collaborative transmission, or the like is made possible.

Further, since a UE determines the number of random access signals for use in random access depending on user requirements, the time when each UE performs random access can be adjusted, and the resource amount required for control or data message exchange subsequent to random access can be requested.

Further, since a set of target RATs for random access, a set of target communication nodes for random access, the number of random access signals for each communication node, and priorities of respective random access signals are determined depending on user requirements (e.g., Quality of Experience (QoE)), network access that meets user QoE is made possible.

Further, since at least two random access signals are determined and the determined random access signals are provided with priorities in consideration of various random access conditions, such as RAT preference, a service charge, the neighbor list ranking, a channel condition, a service condition, an access condition, the type of a target RAT for random access, the type of a target communication node for random access, a bandwidth for use in random access, a distance between a UE and a target communication node for random access, the loading factor of a target communication node for random access, information on collided channels, and a collision probability, random access can be performed in such a manner as to guarantee user requirements (e.g., QoE).

Further, since random access parameters, such as a RAT for each signal, a communication node for each signal, a channel group for each signal, a channel (e.g., frequency, time, code, antenna, etc.) for each signal, power for each signal, transmission order for each signal, a modulation parameter for each signal, a coding parameter for each signal, a length for each signal, a bandwidth for each signal, a processing gain for each signal, and information included in each signal, is determined according to the priorities of respective random access signals, random access control differentiated according to a plurality of RATs and/or communication nodes can be performed.

Further, since a UE performs multiple access according to a set of available RATs and a set of available communication nodes, efficient network use is made possible.

Further, since a UE is allowed to perform multiple RAT access or multiple communication node access by using network load information, network load can be distributed.

While the invention has been shown and described with reference to certain exemplary embodiments thereof, it will be understood by those skilled in the art that various changes in form and details may be made therein without departing from the spirit and scope of the invention as defined by the appended claims.

BRIEF DESCRIPTION OF DRAWINGS

The above and other aspects, features and advantages of certain exemplary embodiments of the present invention will be more apparent from the following description taken in conjunction with the accompanying drawings, in which:

FIGS. 2A to 2M are views for explaining random access methods using channels or channel groups that are set differently by a UE among random access signals with different priorities in a wireless communication system according to an exemplary embodiment of the present invention;

FIG. 3 is a view for explaining a random access method in which a UE sets different frequencies for random access signals according to priorities and transmits the random access signals through the corresponding frequencies in a wireless communication system according an exemplary embodiment of the present invention;

The same reference numerals are used to represent the same elements throughout the drawings.

DETAILED DESCRIPTION OF EXEMPLARY EMBODIMENTS

Figure 1:
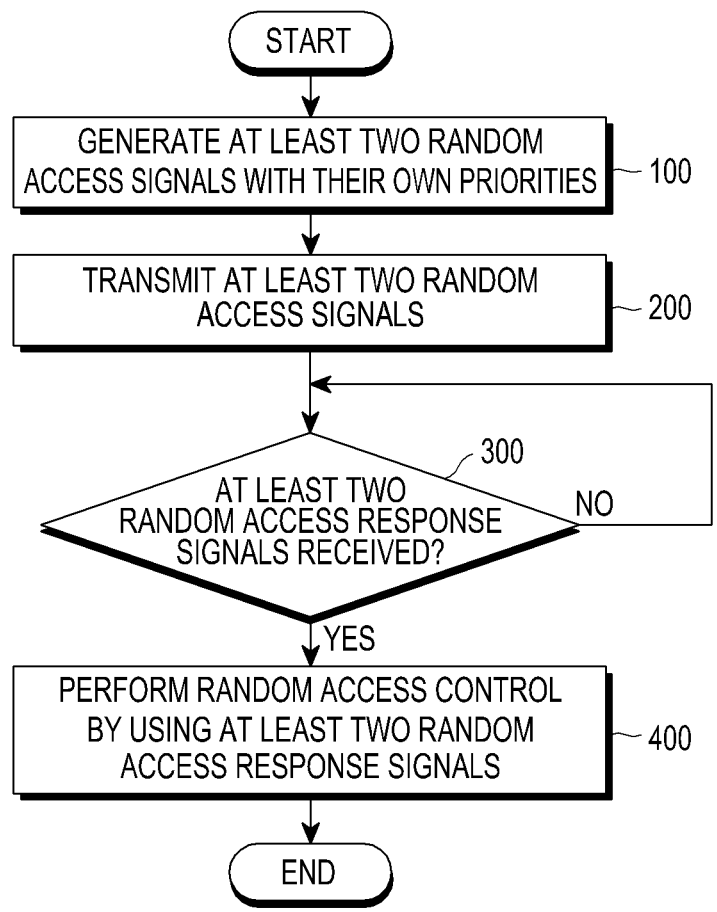
FIG. 1 is a flowchart illustrating an operation in which a User Equipment (UE) performs random access control in a wireless communication system according to an exemplary embodiment of the present invention.

Hereinafter, embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A User Equipment (UE) can support various Radio Access Technologies (RATs) in order to perform random access to at least one communication node. Here, the RAT refers to a radio access technology for connecting a UE to a wireless access network, and covers not only the existing radio access technologies including Global System for Mobile communications (GSM), Code Division Multiple Access 2000 (CDMA2000), Wideband Code Division Multiple Access (WCDMA), Long Term Evolution (LTE), Wireless Broadband (WiBro), Wireless Local Area Network (WLAN), and the like, but also all types of RATs that may be developed later on.

In the present disclosure, a random access channel refers to a resource that a UE uses to transmit at least one random access signal. Each target RAT and/or communication node for random access may have its own unique random access channel.

The random access channel is divided by at least one resource, such as frequency, time, code, or antenna, and may be divided in the form of a combination of at least two resources. As an example, in an LTE system, that is, an Orthogonal Frequency-Division Multiplexing (OFDM) system, a random access channel is divided in the form of a combination of frequency and time.

When the UE performs random access to at least two communication nodes, it uses a separate random access channel for each communication node, and the random access channels for the at least two communication nodes may be the same or different.

In the present disclosure, a random access signal refers to a signal that a UE transmits to a communication node over a random access channel in order to perform random access. The UE transmits a unique random access signal to each target RAT and/or communication node for random access, and the random access signal may contain various information.

As an example, the random access signal may contain user IDentification (ID) information, and may also contain information on the amount of resources required. Further, the random access signal may include a digital signal or an analog signal. As an example, in LTE, the random access signal uses a Zadoff-Chu (ZC) sequence.

When the UE performs random access to at least two target communication nodes, it transmits a unique random access signal for each target communication node, and the random access signals for the at least two target communication nodes may be the same or different.

FIG. 1 illustrates an operation in which a UE performs random access control in a wireless communication system according to an exemplary embodiment of the present invention. FIG. 1 shows a process of generating at least two random access signals with their own priorities and transmitting the generated least two random access signals with their own priorities to at least one target communication node or at least two target communication nodes.

Referring to FIG. 1, in step 100, the UE generates at least two random access signals with their own priorities for transmission to at least one target communication node or at least two target communication nodes.

In step 200, the UE transmits the at least two random access signals with their own priorities to the at least one target communication node or the at least two target communication nodes.

Subsequently, upon receiving at least two random access response signals from the at least one target communication node or the at least two target communication nodes in response to the at least two random access signals, the UE detects this in step 300, and proceeds to step 400. In step 400, the UE selects some or all of the at least two random access response signals and performs random access control by using the selected random access response signals.

First, reference will be made in detail to step 100 in which the UE generates at least two random access signals with their own priorities.

In consideration of at least one of random access condition, the UE determines random access parameters for at least two random access signals.

By determining the priorities for the respective random access signals according to the determined random access parameters, the UE generates at least two random access signals with their own priorities for transmission to the at least one communication node.

In the process of determining the random access parameters for transmitting the at least two random access signals to the at least one communication node, if a target RAT for random access has been determined according to the active RAT of the UE, determining a RAT for each random access signal may be omitted in the random access parameter determination process. Also, in the process of the random access parameters for transmitting the at least two random access signals to the at least one communication node, if a target RAT for random access has been determined according to the active RAT of the UE and a communication node specified by the network has been determined, determining a RAT for random access for each signal and determining a communication node for each random access signal may be omitted.

In the process of determining the random access parameters for transmitting the at least two random access signals to the at least two communication nodes, the UE may determine at least two communication nodes, the RATs of which are partially or completely the same. The UE may also determine at least two communication nodes, the RATs of which are partially or completely different. Further, the UE may determine at least two communication nodes, the RATs of which are partially or completely the same, and determine the random access parameters in such a manner as to transmit at least two random access signals to each of the determined at least two communication nodes. Further, the UE may determine at least two communication nodes, the RATs of which are partially or completely different, and determine the random access parameters in such a manner as to transmit at least two random access signals to each of the determined at least two communication nodes.

The random access conditions are the factors that the UE considers in generating the at least two random access signals, and include one or more of RAT preference, a service charge, the neighbor list ranking, a channel condition, a service condition, an access condition, the type of a target RAT for random access, the type of a target communication node for random access, a bandwidth for use in random access, a distance between a UE and a target communication node for random access, the loading factor of a target communication node for random access, information on collided channels, a collision probability, and the like.

Hereinafter, the random access conditions identified above will be discussed.

A first random access condition, the RAT preference, represents the ranking of UE or user preference for RATs. A UE generates at least two random access signals by determining the random access parameters and priority for each random access signal according to the RAT preference.

As an example, when the RAT preference of a UE having LTE, Wibro, and WLAN modems indicates that WLAN is set to the first rank, LTE is set to the second rank, and WiBro is set to the third rank, the UE generates three random access signals by determining the random access parameters and priority for each random access signal in such a manner as to transmit one first-priority random access signal to a first Base Station (BS) corresponding to WLAN RAT, transmit one second-priority random access signal to a second BS corresponding to LTE RAT, and transmit one third-priority random access signal to a third BS corresponding to WiBro RAT.

A second random access condition, the service charge, represents a fee paid by a user for a communication service. A UE generates at least two random access signals by determining the random access parameters and priority for each random access signal according to the service charge.

As an example, when a UE generates random access signals by using the service charge, it generates three random access signals by determining the random access parameters and priority for each random access signal in such a manner as to transmit one first-priority random access signal to a first BS, the service charge of which is lowest (for example, 0 won/sec), transmit one second-priority random access signal to a second BS, the service charge of which is intermediate (for example, 5 won/sec), and transmit one third-priority random access signal to a third BS, the service charge of which is highest (for example, 10 won/sec).

A third random access condition, he neighbor list ranking, represents the ranking of RATs and/or communication nodes, which is given in a neighbor list provided by the network. A UE generates at least two random access signals by determining the random access parameters and priority for each random access signal according to the neighbor list ranking.

As an example, when a UE generates random access signals by using the neighbor list ranking, it determines four random access signals by determining the random access parameters and priority for each random access signal in such a manner as to transmit one first-priority random access signal to a first WLAN AP corresponding to the first rank in the neighbor list ranking, transmit one second-priority random access signal to a first LTE BS corresponding to the second rank in the neighbor list ranking, transmit one third-priority random access signal to a second LTE BS corresponding to the third rank in the neighbor list ranking, and transmit one fourth-priority random access signal to a second WLAN AP corresponding to the fourth rank in the neighbor list ranking.

A fourth random access condition, the channel condition, represents the channel environment between a UE and a target communication node for random access. A UE generates at least two random access signals by determining the random access parameters and priority for each random access signal according to the channel condition. The channel condition may be largely divided into a quality factor related to channel characteristics (channel characteristic-quality factor) and a quality factor related to space characteristics (space characteristic-quality factor).

The channel characteristic-quality factor includes one or more of a Received Signal Strength Indicator (RSSI), a Signal-to-Noise Ratio (SNR), a Signal-to-Interference plus Noise Ratio (SINR), an error rate, a channel capacity, an available transmission rate, a variance of available transmission rates, an outage rate, and the like that are determined according to channel characteristics, such as fading, path fading, shadowing, delay spread, multipath, intra-cell interference, adjacent-cell interference, Doppler effect, antenna gain, and channel allocation. Of course, other parameters related to channel characteristics may also be used as the channel characteristic-quality factor.

The RSSI is an indicator of the strength of a received signal measure data receiving end, the SNR is an indicator of the ratio of signal power to noise power, and the SINR is an indicator of the ratio of signal power to interference and noise power.

The error rate is the probability of error occurrence during signal transmission, and includes one or more of a Bit Error Rate (BER), a Block Error Rate (BLER), a Frame Error Rate (FER), a Packet Error Rate (PER), and the like. The channel capacity is the maximum amount of information transmittable over a channel without any error. The available transmission rate is an actually achievable transmission rate in consideration of channel characteristic parameters, which may be expressed in the form of an instantaneous transmission rate or an average transmission rate, and includes one or more of a total transmission rate, a transmission rate on a user-by-user basis, a transmission rate on a stream-by-stream basis, and the like.

The variance of available transmission rates is an indicator of the degree of a change in transmission rates available according to channel characteristics, and the outage rate is the probability of communication outage that may occur when a channel quality is below a reference value according to a fixed communication outage criterion including the RSSI, SNR, error rate, channel capacity, and available transmission rate. As an example, when the communication outage criterion is set to 0 dB SNR, the outage rate is determined according to the probability that a user experiences a channel having an SNR of 0 dB or less.

The space characteristic-quality factor is a quality factor for additionally considering space characteristics for the channel characteristic-quality factor when signals are transmitted to multiple user groups by using multiple antennas, and includes one or more of a correlation between user channels, a correlation between antennas, the rank of a channel matrix, channel quality parameters according to streams, and the like. Of course, other parameters related to space characteristics may also be used as the space characteristic-quality factor.

The correlation between user channels is an indicator of the degree of similarity of channel characteristics between user channels. When the correlation between user channels is high, the user channels have similar channel characteristics, which results in performance deterioration during multiuser space division multiplexing transmission.

The correlation between antennas is an indicator of the degree of similarity of channel characteristics between channels formed by multiple antennas when a receiving UE uses the multiple antennas. When the correlation between antennas is high, channels formed by the antennas have similar channel characteristics, which results in performance deterioration during space division multiplexing transmission using multiple antennas.

The rank of a channel matrix is an indicator of the number of data streams independently available for a channel matrix formed between a transmitter and a receiver.

The channel quality parameters according to streams are the strengths of respective streams corresponding to the number of data streams independently available for a channel matrix formed between a transmitter and a receiver, and include one or more of the RSSI, SNR, SINR, error rate, channel capacity, available transmission rate, variance of available transmission rates, outage rate, and the like.

As an example, when the UE generates random access signals by using the channel condition, it generates three random access signals by determining the random access parameters and priority for each random access signal in such a manner as to transmit one first-priority random access signal to a first BS having a high SNR (for example, 15 dB) and transmit two second-priority random access signals to a second BS having a low SNR (for example, 5 dB).

A fifth random access condition, the service condition, represents a condition related to a user required service. A UE generates at least two random access signals by determining the random access parameters and priority for each random access signal according to the service condition.

The service condition includes one or more of a Quality of Service (QoS), a traffic class, and the like.

The QoS includes one or more of a required delay, a required transmission rate, a required error rate, a required bandwidth, a required outage rate, and the like.

The traffic class is the type of each user required service, and includes one or more of a huge data file, a voice call, a video call, a video streaming, a web browsing, a game, and the like.

As an example, when a UE generates random access signals by using the service condition, the UE requesting a service with a required transmission rate (for example, 1 Mbps) generates two random access signals by determining the random access parameters and priority for each random access signal in such a manner as to transmit one first-priority random access signal to a first BS having a high available transmission rate (for example, 2 Mbps) and transmit one second-priority random access signal to a second BS having a low available transmission rate (for example, 0.8 Mbps).

As another example, when a UE generates random access signals by using the service condition, the UE requesting a service with a required error rate (for example, 10%) generates three random access signals by determining the random access parameters and priority for each random access signal in such a manner as to transmit one first-priority random access signal to a first BS having a low error rate (for example, 5%) and transmit two second-priority random access signals to a second BS having a high error rate (for example, 8%).

As yet another example, when a UE generates random access signals by using the service condition, the UE requesting a voice call service generates three random access signals by determining the random access parameters and priority for each random access signal in such a manner as to transmit one first-priority random access signal to a first BS and transmit two second-priority random access signals to a second BS.

A sixth random access condition, the access condition, represents a condition related to an access environment between communication nodes. A UE generates at least two random access signals by determining the random access parameters and priority for each random access signal according to the access condition.

The access condition includes at least one of an available RAT type, the number of communication nodes available for each RAT, availability for each communication node, load for each communication node, a user access condition, and the like.

The available RAT type represents the type of a connectable RAT around a UE, and the number of communication nodes available for each RAT represents the number of connectable communication nodes for each RAT around a UE.

The availability for each communication node represents whether or not a UE can be connected to communication nodes around the UE, the load for each communication node represents load for communication nodes around a UE, and the user access condition represents the reason why a UE performing random access is to be connected to communication nodes around the UE. This use access condition includes one or more of an initial access, a handover access, and the like.

The handover access includes one or more of intra-cell handover access, inter-cell handover access, heterogeneous network handover access, multipath access, multihoming access, multisession access, and the like.

The intra-cell handover access is handover access performed by a UE when the UE moves between sectors within a single cell, the inter-cell handover access is handover access performed by a UE when the UE moves between adjacent cells, and the heterogeneous network handover access is handover access performed by a UE when the UE moves between cell areas, the RATs of which are different. By way of example, a UE performs the heterogeneous network handover access when moving from a WCDMA area to a WLAN area.

The multipath access is network access performed by a UE through a plurality of paths, the multihoming access is a UE's simultaneous access to a plurality of communication nodes for one service session, and the multisession access is a UE's access to at least one communication node for the connection of multiple sessions.

As an example, when a UE generates random access signals by using the access condition, the UE performing a handover generates two random access signals by determining the random access parameters and priority for each random access signal in such a manner as to transmit one first-priority random access signal to a first BS and transmit one second-priority random access signal to a second BS.

A seventh random access condition, the type of a target RAT for random access, represents the type of a RAT which a UE is to access in order to be provided with a communication service. A UE generates at least two random access signals by determining the random access parameters and priority for each random access signal according to the type of a RAT for random access. Here, the type of a RAT for random access is different from the RAT preference in that the latter is a factor determined by a user or a UE, and the former is a factor presented by a system or a network provider.

As an example, when a UE having LTE, WiBro, and WLAN modems generates random access signals by using the type of a RAT for random access, it generates three random access signals by determining the random access parameters and priority for each random access signal in such a manner as to transmit one first-priority random access signal to a first BS corresponding to LTE RAT, transmit one second-priority random access signal to a second BS corresponding to WiBro RAT, and transmit one third-priority random access signal to a third BS corresponding to WLAN RAT.

An eighth random access condition, the type of a target communication node for random access, represents the type of a communication node for connecting a UE to a wireless access network. A UE generates at least two random access signals by determining the random access parameters and priority for each random access signal according to the type of a target communication node for random access.

As an example, when a UE generates random access signals by using the type of a target communication node for random access, it generates three random access signals by determining the random access parameters and priority for each random access signal in such a manner as to transmit one first-priority random access signal to a BS, transmit one second-priority random access signal to a femto cell BS, and transmit one third-priority random access signal to a relay.

A ninth random access condition, the bandwidth for use in random access, represents the bandwidth of a channel that a target communication node for random access uses for random access. A UE generates at least two random access signals by determining the random access parameters and priority for each random access signal according to the bandwidth for use in random access.

As an example, when a UE generates random access signals by using the bandwidth for use in random access, it generates three random access signals by determining the random access parameters and priority for each random access signal in such a manner as to transmit two first-priority random access signals to a first BS with a wide bandwidth (for example, 50 kHz) and transmit one second-priority random access signal to a second BS with a narrow bandwidth (for example, 20 kHz).

A tenth random access condition, the distance between a UE and a target communication node for random access, represents a physical distance between a UE and a target communication node for random access. A UE generates at least two random access signals by determining the random access parameters and priority for each random access signal according to the distance between the UE and a target communication node for random access.

As an example, when a UE generates random access signals by using the distance between the UE and a target communication node for random access, it generates three random access signals by determining the random access parameters and priority for each random access signal in such a manner as to transmit one first-priority random access signal to a first BS at a short distance (for example, 100 m) and transmit two second-priority random access signals to a second BS at a long distance (for example, 300 m).

An eleventh random access condition, the loading factor of a target communication node for random access, represents the resource loading factor of a target communication node for random access. A UE generates at least two random access signals by determining the random access parameters and priority for each random access signal according to the loading factor of a target communication node for random access.

As an example, when a UE generates random access signals by using the loading factor of a target communication node for random access, it generates two random access signals by determining the random access parameters and priority for each random access signal in such a manner as to transmit one first-priority random access signal to a first BS with a low loading factor (for example, 30%) and transmit one second-priority random access signal to a second BS with a high loading factor (for example, 60%).

A twelfth random access condition, the collision channel information, represents information on random access channels that have collided in the previous random access frame of a target communication node or average collision information for each random access channel. A UE generates at least two random access signals by determining the random access parameters and priority for each random access signal according to the collision channel information of a target communication node.

As an example, when a UE generates random access signals by using the collision channel information, it generates three random access signals by determining the random access parameters and priority for each random access signal in such a manner as to transmit one first-priority random access signal to a first BS where the number of collision channels in the previous frame is small (for example, two channels) and transmit two second-priority random access signals to a second BS where the number of collision channels in the previous frame is large (for example, six channels).

A thirteenth random access condition, the collision probability, represents the probability that channel collision occurs in the previous random access frame of a target communication node for random access or the average probability of occurrence of channel collision. A UE generates at least two random access signals by determining the random access parameters and priority for each random access signal according to the collision probability. The collision probability may be defined by the following equations:

$$\text{collision probability} = \frac{\text{no. of collided random access channels}}{\text{total no. of random access channels}} \quad \text{Equation (1)}$$

$$\text{collision probability} = \frac{\text{no. of collided random access channels}}{\text{no. of used random access channels}} \quad \text{Equation (2)}$$

Equation (1) represents the ratio of the number of collided channels to the total number of random access channels, and Equation (2) represents the ratio of the number of collided channels to the number of used random access channels.

As an example, when a UE generates random access signals by using the collision probability, it generates three random access signals by determining the random access parameters and priority for each random access signal in such a manner as to transmit one first-priority random access signal to a first BS with a low average collision probability (for example, 10%) and transmit two second-priority random access signals to a second BS with a high average collision probability (for example, 30%).

In generating the at least two random access signals in consideration of the random access conditions as described above, a combination of at least two of the random access conditions can be used as described below.

In the following, a description will be given of the case where a UE uses a combination of at least two random access conditions. Although examples of using a combination of two or three random access conditions will be described, these examples are only a part of various combinations of the above random access conditions, and it is obvious that a combination of four or more random access conditions may also be used.

Reference will be made first to a random access method according to exemplary embodiments of the present invention, in which a UE can use a combination of at least two random access conditions. In this random access method, a UE generates at least two random access signals by determining the random access parameters and priority for each random access signal in consideration of the at least two random access conditions.

Firstly, in generating at least two random access signals, a UE generates the at least two random access signals by determining the random access parameters and priority for each random access signal according to the type of a target communication node while satisfying a required delay condition.

As an example, when a UE considers a required delay condition and the type of a target communication node for random access, the UE requesting a service with a required delay (for example, 50 ms) generates three random access signals by determining the random access parameters and priority for each random access signal according to the type of a target communication node for random access among communication nodes guaranteeing the required delay condition (for example, 50 ms) in such a manner as to transmit one first-priority random access signal to a first BS (for example, a transmission delay of 40 ms), transmit one second-priority random access signal to a first fem to cell BS (for example, an available transmission rateofl Mbps), and transmit one third-priority random access signal to a first relay (for example, an available transmission rate of 2 Mbps).

Secondly, in generating at least two random access signals, a UE generates the at least two random access signals by determining the random access parameters and priority for each random access signal according to RAT preference while satisfying a required bandwidth condition.

As an example, when a UE considers a required bandwidth condition and RAT preference, and the RAT preference of the UE having LTE, WiBro, and WLAN modems indicates that WLAN is set to the first rank, LTE is set to the second rank, and WiBro is set to the third rank, the UE requesting a service with a required bandwidth (for example, 500 kHz) generates three random access signals by determining the random access parameters and priority for each random access signal according to the RAT preference among communication nodes guaranteeing the required bandwidth condition (for example, 500 kHz) in such a manner as to transmit one first-priority random access signal to a first BS (for example, an available bandwidth of 1 MHz) corresponding to WLAN RAT, transmit one second-priority random access signal to a second BS (for example, an available bandwidth of 800 kHz) corresponding to LTE RAT, and transmit one third-priority random access signal to a third BS (for example, an available bandwidth of 900 kHz) corresponding to WiBro RAT.

Next, reference will be made to a random access method according to exemplary embodiments of the present invention, in which a UE can use a combination of at least three random access conditions. In this random access method, a UE generates at least two random access signals by determining the random access parameters and priority for each random access signal in consideration of the at least three random access conditions.

Firstly, in generating at least two random access signals, a UE generates the at least two random access signals by determining the random access parameters and priority for each random access signal according to a channel condition while satisfying a required transmission rate and a required error rate.

As an example, when a UE considers a required transmission rate, a required error rate, and a channel condition, the UE requesting a service with a required transmission rate (for example, 1 Mbps) and a required error rate (for example, 5%) generates three random access signals by determining the random access parameters and priority for each random access signal according to an SNR among communication nodes guaranteeing the required transmission rate (for example, 1 Mbps) and the required error rate (for example, 5%) in such a manner as to transmit one first-priority random access signal to a first BS (for example, an available transmission rate of 1.5 Mbps and an error rate of 3%) with a high SNR and transmit two second-priority random access signals to a second BS (for example, an available transmission rate of 1.2 Mbps and an error rate of 7%) with a low SNR.

Hereinafter, the random access parameter determination process will be described.

The random access parameter determination process may be performed differently depending on the order of determining the number of random access signals, priorities for random access signals, and random access parameters.

The random access parameter includes one or more of a RAT for each signal, a target communication node for each signal, a channel (e.g., frequency, time, code, antenna, etc.) for each signal, a channel group for each signal, power for each signal, transmission order for each signal, a modulation parameter for each signal, a coding parameter for each signal, a length for each signal, a bandwidth for each signal, a processing gain for each signal, information included in each signal, and the like.

In the random access parameter determination process, the number of random access signals, priorities for random access signals, and random access parameters are determined, and the random access parameter determination process may be performed differently depending on the order of the determined number of random access signals, the determined priorities for random access signals, and the determined random access parameters.

Although only several examples of the random access parameter determination process will be described below for the convenience of description, it is obvious that various examples of the random access parameter determination process may be given using the above-cited random access parameters.

First of all, in the random access parameter determination process, the number of random access signals, priorities for random access signals and random access parameters are determined at the same time.

As an example, in the random access parameter determination process, the number of random access signals, priorities for random access signals and random access parameters are determined in such a manner that first and second random access signals with the first priority are allocated a transmission power of 50 mW as their random access parameter and are transmitted to a first BS, and a third random access signal with the second priority is allocated a transmission power of 30 mW as its random access parameter and is transmitted to a second BS. In this case, the number of random access signals is determined as 3, the priorities for random access signals are determined as two first-priority signals and one second-priority signals, and the random access parameter for each random access signal is determined as the transmission power.

In the second place, in the random access parameter determination process, the number of random access signals is determined first and then priorities for random access signals and random access parameters are simultaneously determined according to the determined number of random access signals.

As an example, in the random access parameter determination process, three random access signals are determined first and then priorities for the random access signals and random access parameters are simultaneously determined in such a manner that a first random access signal is provided with the first priority and is transmitted to a first BS corresponding to LTE RAT as its random access parameter, a second random access signal is provided with the second priority and is transmitted to a second BS corresponding to WLAN RAT as its random access parameter, and a third random access signal is provided with the third priority and is transmitted to a third BS corresponding to WCDMA RAT as its random access parameter. In this case, the number of random access signals is determined as 3, the priorities for random access signals are determined as one first-priority signal, one second-priority signal and one third-priority signal, and the random access parameter for each random access signal is determined as the RAT.

In the third place, in the random access parameter determination process, priorities for random access signals are determined first and then the number of random access signals and random access parameters are simultaneously determined according to the determined priorities for random access signals.

As an example, in the random access parameter determination process, priorities for random access signals are determined first as including first to third priorities and then the number of random access signals and random access parameters are simultaneously determined in such a manner that a first random access signal is provided with the first priority and is transmitted to a BS as its random access parameter, a second random access signal is provided with the second priority and is transmitted to a relay as its random access parameter, and a third random access signal is provided with the third priority and is transmitted to a femto cell BS as its random access parameter. In this case, the number of random access signals is determined as 3, the priorities for random access signals are determined as one first-priority signal, one second-priority signal and one third-priority signal, and the random access parameter for each random access signal is determined as the target communication node.

In the fourth place, in the random access parameter determination process, random access parameters are determined first and then the number of random access signals and priorities for random access signals are simultaneously determined according to the determined random access parameters.

As an example, in the random access parameter determination process, a bandwidth including first to third bandwidths is determined first as random access parameters and then the number of random access signals and priorities for random access signals are simultaneously determined in such a manner that a first random access signal is provided with the first priority and is transmitted in the first bandwidth as its random access parameter, a second random access signal is provided with the second priority and is transmitted in the second bandwidth as its random access parameter, and a third random access signal is provided with the third priority and is transmitted in the third bandwidth as its random access parameter. In this case, the number of random access signals is determined as 3, the priorities for random access signals are determined as one first-priority signal, one second-priority signal and one third-priority signal, and the random access parameter for each random access signal is determined as the bandwidth.

In the fifth place, in the random access parameter determination process, the number of random access signals and priorities for random access signals are simultaneously determined first and then random access parameters are determined according to the determined number of random access signals and the determined priorities for random access signals.

As an example, in the random access parameter determination process, three random access signals are determined first in such a manner that a first random access signal is provided with the first priority, a second random access signal is provided with the second priority, and a third random access signal is provided with the third priority. Random access parameters are then determined in such a manner that the first random access signal with the first priority is transmitted using Quadrature Phase Shift Keying (QPSK) modulation as its random access parameter, the second random access signal with the second priority is transmitted using 16 Quadrature Amplitude Keying (16QAM) modulation as its random access parameter, and a third random access signal with the third priority is transmitted using 64 Quadrature Amplitude Keying (64QAM) modulation as its random access parameter. In this case, the number of random access signals is determined as 3, the priorities for random access signals are determined as one first-priority signal, one second-priority signal and one third-priority signal, and the random access parameter for each random access signal is determined as the modulation parameter.

In the sixth place, in the random access parameter determination process, the number of random access signals and random access parameters are simultaneously determined first and then priorities for random access signals are determined according to the determined number of random access signals and the determined random access parameters.

As an example, in the random access parameter determination process, three random access signals are determined first in such a manner that first and second random access signals are transmitted to a first BS corresponding to LTE RAT as their random access parameter, and a third random access signal is transmitted to a second BS corresponding to WLAN RAT as its random access parameter. Priorities for random access signals are then determined in such a manner that the first and second random access signals are provided with the first priority, and the third random access signal is provided with the second priority. In this case, the number of random access signals is determined as 3, the priorities for random access signals are determined as two first-priority signals and one second-priority signal, and the random access parameter for each random access signal is determined as the RAT.

In the seventh place, in the random access parameter determination process, priorities for random access signals and random access parameters are simultaneously determined first and then the number of random access signals is determined according to the determined priorities for random access signals and the determined random access parameters.

As an example, in the random access parameter determination process, priorities for random access signals and random access parameters are simultaneously determined first in such a manner that a transmission power of 50 mW as the random access parameter is allocated to the first priority, and a transmission power of 20 mW as the random access parameter is allocated to the second priority. Three random access signals are then determined in such a manner as to transmit a first random access signal provided with the first priority, and second and third random access signals provided with the second priority. In this case, the number of random access signals is determined as 3, the priorities for random access signals are determined as one first-priority signal and two second-priority signals, and the random access parameter for each random access signal is determined as the transmission power.

In the eighth place, in the random access parameter determination process, the number of random access signals is determined first, priorities for random access signals is determined according to the determined number of random access signals, and then random access parameters are determined according to the determined number of random access signals and the determined priorities for random access signals.

As an example, in the random access parameter determination process, three random access signals are determined first and then priorities for random access signals are determined in such a manner that a first random access signal is provided with the first priority, a second random access signal is provided with the second priority, and a third random access signal is provided with the third priority. Subsequently, random access parameters are determined in such a manner as to transmit the first random access signal to a first BS corresponding to WLAN RAT as its random access parameter, transmit the second random access signal to a second BS corresponding to LTE RAT as its random access parameter, and transmit the third random access signal to a third BS corresponding to WCDMA RAT as its random access parameter. In this case, the number of random access signals is determined as 3, the priorities for random access signals are determined as one first-priority signal, one second-priority signal and one third-priority signal, and the random access parameter for each random access signal is determined as the RAT.

In the ninth place, in the random access parameter determination process, the number of random access signals is determined first, random access parameters are determined according to the determined number of random access signals, and then priorities for random access signals are determined according to the determined number of random access signals and the determined random access parameters.

As an example, in the random access parameter determination process, two random access signals are determined first and then random access parameters are determined in such a manner as to transmit a first random access signal to a BS as its random access parameter and transmit a second random access signal to a relay as its random access parameter. Subsequently, priorities for random access signals are determined in such a manner as to provide the first random access signal with the first priority and provide the second random access signal with the second priority. In this case, the number of random access signals is determined as 2, the priorities for random access signals are determined as one first-priority signal and one second-priority signal, and the random access parameter for each random access signal is determined as the target communication node.

In the tenth place, in the random access parameter determination process, priorities for random access signals are determined first, the number of random access signals is determined according to the determined priorities for random access signals, and then random access parameters are determined according to the determined priorities for random access signals and the determined number of random access signals.

As an example, in the random access parameter determination process, priorities for random access signals is determined first as including the first and second priorities and then two random access signals are determined in such a manner as to transmit a first random access signal provided with the first priority and a second random access signal provided with the second priority. Subsequently, random access parameters are determined in such a manner as to transmit the first random access signal with a coding rate of 1/3 as its random access parameter and transmit the second random access signal with a coding rate of 1/2 as its random access parameter. In this case, the number of random access signals is determined as 2, the priorities for random access signals are determined as one first-priority signal and one second-priority signal, and the random access parameter for each random access signal is determined as the coding parameter.

In the eleventh place, in the random access parameter determination process, priorities for random access signals are determined first, random access parameters are determined according to the priorities for random access signals, and then the number of random access signals is determined according to the determined priorities for random access signals and the determined random access parameters.

As an example, in the random access parameter determination process, priorities for random access signals are determined first as including the first to third priorities and then random access parameters are determined in such a manner that a signal length of 80 ms is allocated to the first priority, a signal length of 50 ms is allocated to the second priority, and a signal length of 30 ms is allocated to the third priority. Subsequently, four random access signals are determined in such a manner as to transmit a first random access signal provided with the first priority, transmit second and third random access signals provided with the second priority, and transmit a fourth random access signal provided with the third priority. In this case, the number of random access signals is determined as 4, the priorities for random access signals are determined as one first-priority signal, two second-priority signals and one third-priority signal, and the random access parameter for each random access signal is determined as the signal length.

In the twelfth place, in the random access parameter determination process, random access parameters are determined first, the number of random access signals is determined according to the determined random access parameters, and then priorities for random access signals are determined according to the determined random access parameters and the determined number of random access signals.

As an example, in the random access parameter determination process, a bandwidth including first to third bandwidths is determined first as random access parameters and then three random access signals are determined. Subsequently, priorities for random access signals are determined in such a manner that a first random access signal is provided with the first priority and is transmitted in the first bandwidth as its random access parameter, a second random access signal is provided with the second priority and is transmitted in the second bandwidth as its random access parameter, and a third random access signal is provided with the third priority and is transmitted in the third bandwidth as its random access parameter. In this case, the number of random access signals is determined as 3, the priorities for random access signals are determined as one first-priority signal, one second-priority signal and one third-priority signal, and the random access parameter for each random access signal is determined as the bandwidth.

In the thirteenth place, in the random access parameter determination process, random access parameters are determined first, priorities for random access signals are determined according to the determined random access parameters, and then the number of random access signals is determined according to the determined random access parameters and the determined priorities for random access signals.

As an example, in the random access parameter determination process, a modulation parameter including Binary Phase Shift Keying (BPSK) and QPSK is determined first as a random access parameter and then priorities for random access signals are determined in such a manner that transmission using BPSK is allocated to the first priority and transmission using QPSK is allocated to the second priority. Subsequently, four random access signals are determined in such a manner as to transmit first and second random access signal provided with the first priority by using BPSK as their random access parameter and transmit third and fourth random access signals provided with the second priority by using QPSK as their random access parameter. In this case, the number of random access signals is determined as 4, the priorities for random access signals are determined as two first-priority signals and two second-priority signals, and the random access parameter for each random access signal is determined as the modulation parameter.

Hereinafter, what determines random access parameters and priorities for random access signals will be described.

Random access parameters and priorities for random access signals to be transmitted to at least one target communication node by a UE may be determined using a predefined criterion presented in a system, by the UE itself, or by the at least one target communication node for random access.

First of all, when a system determines random access parameters and priorities for random access signals, random access parameters and priorities for at least two random access signals are determined according to a predefined criterion presented in the system.

As an example, when a UE supporting a first RAT transmits first and second random access signals in order to access a BS of the first RAT and a femto cell BS of the first RAT, it provides the first random access signal to be transmitted to the BS with the first priority and provides the second random access signal to be transmitted to the femto cell BS with the second priority according to a predefined criterion.

In the second place, when a UE determines random access parameters and priorities for random access signals, random access parameters and priorities for at least two random access signals are determined by the UE itself.

As an example, when a UE supporting a first RAT transmits first and second random access signals in order to access a first BS of the first RAT and a second BS of the first RAT, the UE itself provides the first random access signal to be transmitted to the first BS with the first priority and provides the second random access signal to be transmitted to the second BS with the second priority.

In the third place, when at least one target communication for random access determines random access parameters and priorities for random access signals, random access parameters and priorities for at least two random access signals to be transmitted are determined by a UE by the request of at least one target communication node for random access, which the UE is to access.

As an example, when a UE supporting first and second RATs transmits four random access signals in order to access a first BS of the first RAT and a second BS of the second RAT, it provides first and second random access signals to be transmitted to the first BS with the first priority by the request of the first BS requesting the UE to provide the highest priority. Further, the UE provides third and fourth random access signals to be transmitted to the second BS with the second priority by the request of the second BS requesting the UE to provide a low priority.

In the fourth place, when at least one target communication node for random access determines random access parameters and priorities for random access signals, random access parameters and priorities for at least two random access signals are determined by the UE in consideration of the request from at least one target communication node for random access, which the UE is to access, and based on the judgment of the UE.

As an example, when a UE supporting first and second RATs transmits four random access signals in order to access a first BS of the first RAT and a second BS of the second RAT, it provides a first random access signal to be transmitted to the first BS with the first priority and provides a second random access signal to be transmitted to the first BS with the second priority in consideration of the request from the first BS requesting the UE to provide the highest priority and based on its own judgment. Further, the UE provides a third random access signal to be transmitted to the second BS with the third priority and provides a fourth random access signal to be transmitted to the second BS with the fourth priority in consideration of the request from the second BS requesting the UE to provide a low priority and based on its own judgment.

Reference will now be made to an operation of differently setting the priorities for random access signals by using the random access parameter.

In the random access method according to exemplary embodiments of the present invention, a UE generates at least two random access signals with their own priorities, and transmits the at least two random access signals with their own priorities. In transmitting the at least two random access signals, at least one of a RAT, a target communication node, a channel (e.g., frequency, time, code, antenna, etc.), a channel group, power, transmission order, a modulation parameter, a coding parameter, a length, a bandwidth, a processing gain, and included information is set differently among the random access signals with different priorities.

In the following, an operation of differently setting each of the above random access parameter components among random access signals with different priorities will be described. Although examples of transmitting four random access signals will be described below for the convenience of description, it is obvious that according to exemplary embodiments of the present invention, a UE may transmit two or three random access signals and may also transmit five or more random access signals while differently setting at least one of a RAT, a target communication node, a channel (e.g., frequency, time, code, antenna, etc.), a channel group, power, transmission order, a modulation parameter, a coding parameter, a length, a bandwidth, a processing gain, and included information according to the priorities for the random access signals in the same manner as the examples of transmitting four random access signals.

With regard to this, some or all of at least two random access signals transmitted by a UE may not be provided with priorities, and the UE transmits the at least one random access signal with no priority by using the default random access parameter while omitting the random access parameter determination process.

First of all, a UE transmits at least two random access signals with different priorities, among which a RAT is set differently.

When a UE transmits four random access signals, it transmits a first random access signal provided with the first priority to a first BS corresponding to LTE RAT, transmits a second random access signal provided with the second priority to a second BS corresponding to WLAN RAT, transmits a third random access signal provided with the third priority to a third BS corresponding to WiBro RAT, and transmits a fourth random access signal provided with the fourth priority to a fourth BS corresponding to WCDMA RAT. In this way, a UE can transmit at least two random access signals while differently setting a RAT according to the priorities for the respective random access signals. Random access signals with the same priority are transmitted using the same RAT. With regard to this, a UE may transmit at least two random access signals with the same priority by using the same RAT as a first random access parameter and by differently setting at least one second random access parameter among the random access signals with the same priority. Here, the second random access parameter includes a target communication node, a channel (e.g., frequency, time, code, antenna, etc.), a channel group, power, transmission order, a modulation parameter, a coding parameter, a length, a bandwidth, a processing gain, and included information.

In the second place, a UE transmits at least two random access signals with different priorities, among which a target communication node is set differently.

When a UE transmits four random access signals, it transmits first and second random access signals provided with the first priority to a BS, transmits a third random access signal provided with the second priority to a relay, and transmits a fourth random access signal provided with the third priority to a femto cell BS. In transmitting the first and second random access signals with the same priority, a transmission time for each signal is set differently so as for a target communication node for random access to distinguish between them. In this way, a UE can transmit at least two random access signals while differently setting a target communication node according to the priorities for the respective random access signals. Random access signals with the same priority are transmitted using the same target communication node. With regard to this, a UE may transmit at least two random access signals with the same priority by using the same target communication node as a first random access parameter and by differently setting at least one second random access parameter among the random access signals with the same priority. Here, the second random access parameter includes at least one of a RAT, a channel (e.g., frequency, time, code, antenna, etc.), a channel group, power, transmission order, a modulation parameter, a coding parameter, a length, a bandwidth, a processing gain, and included information.

In the third place, a UE transmits at least two random access signals with different priorities, among which a channel group is set differently.

An operation of differently setting priorities for at least two random access signals by using the channel group will be described with reference to FIGS. 2A to 2M.

(1) Channel Grouping Method

In order to differently set a channel group among at least two random access signals with different priorities, a UE may perform channel grouping according to the following strategy. A UE performs channel grouping in a manner such that at least one of the following conditions are met:

- some or all of at least two random access channel groups include mutually orthogonal channels;
- some or all of at least two random access channel groups include the same at least one channel;
- some or all of at least two random access channel groups are different in the number of channels;
- some or all of at least two random access channel groups are the same in the number of channels;
- some or all of at least two random access channel groups are provided with different selection probabilities;
- some or all of at least two random access channel groups are provided with the same selection probability;
- some or all of at least two random access channel groups include at least two channel subgroups;
- some or all of at least two channel subgroups include mutually orthogonal channels; or some or all of at least two channel subgroups include the same at least one channel;
- some or all of at least two channel subgroups are different in the number of channels; or some or all of at least two channel subgroups are the same in the number of channels;
- some or all of at least two channel subgroups are provided with different selection probabilities; and
- some or all of at least two channel subgroups are provided with the same selection probability.

(2) Channel Selection Method Using Channel Group

In order to differently set a channel group among at least two random access signals with different priorities, a UE may select random access channels for transmission of at least two random access signals according to the following strategy.

A UE selects random access channels for transmission of some or all of at least two random access signals with different priorities, from different channel groups; or from the same channel group.

(3) Definition of Random Access Channel

The random access channel is a radio channel defined for transmission of a random access signal, and is formed by one or more of a frequency, a time, a code, an antenna, and the like. The random access channel group is a set of at least one random access channel. When one random access signal is transmitted, any one channel is selected from channels included in a random access channel group, and the random access signal is transmitted over the selected channel. In order to transmit a plurality of random access signals, random access channels must be selected such that overlapping of the same random access channel is avoided and the plurality of random access signals are transmitted using different random access channels respectively.

(4) Examples of Channel Grouping According to Priorities

In order to differently set a channel group according to priorities for respective random access signals, channel grouping may be performed in such a manner that some or all of at least two random access channel groups include mutually orthogonal channels.

FIG. 2A illustrates a random access method in a wireless communication system, in which a UE uses random access channel groups including mutually orthogonal random access channels according to an exemplary embodiment of the present invention.

Referring to FIG. 2A, three random access channel groups include mutually orthogonal random access channels. A first random access channel group includes first to eighth random access channels, a second random access channel group includes ninth to fifteenth random access channels, and a third random access channel group includes sixteenth to twentieth random access channels.

In order to differently set a channel group according to priorities for respective random access signals, channel grouping may be performed in such a manner that some or all of at least two random access channel groups overlap.

FIG. 2B illustrates a random access method in a wireless communication system, in which a UE uses random access channel groups including partially overlapping random access channels according to an exemplary embodiment of the present invention.

Referring to FIG. 2B, three random access channel groups partially overlap. A first random access channel group includes first to fifteenth random access channels, a second random access channel group includes sixth to fifteenth random access channels, and a third random access channel group includes eleventh to fifteenth random access channels.

In order to differently set a channel group according to priorities for respective random access signals, channel grouping may be performed in such a manner that some or all of at least two random access channel groups are different in the number of channels.

Figure 2C:
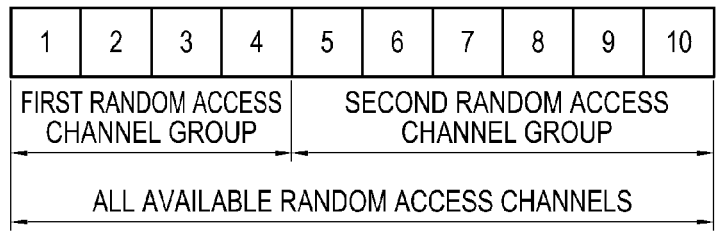

FIG. 2C illustrates a random access method in a wireless communication system, in which a UE uses random access channel groups, each including a different number of random access channels, according to an exemplary embodiment of the present invention.

Referring to FIG. 2C, a first random access channel group includes four random access channels, and a second random access channel group includes six random access channels, so that these two random access channel groups are different in the numbers of random access channels.

In order to differently set a channel group according to priorities for respective random access signals, channel grouping may be performed in such a manner that some or all of at least two random access channel groups are the same in the number of channels.

As an example, first and second random access channel groups include five random access channels respectively, so that these two random access channel groups are the same in the number of random access channels.

In order to differently set a channel group according to priorities for respective random access signals, channel grouping may be performed in such a manner that some or all of at least two random access channel groups are provided with different selection probabilities.

Figure 2D:
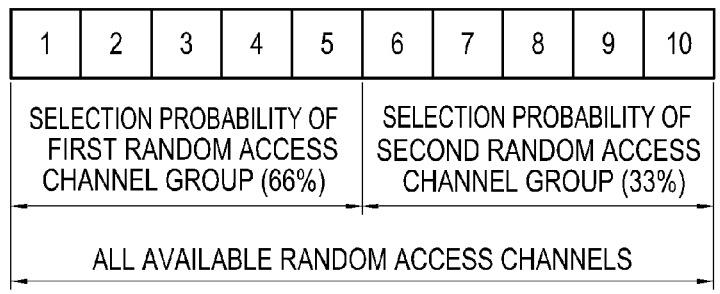

FIG. 2D illustrates a random access method in a wireless communication system, in which a UE provides respective random access channel groups with different selection probabilities according to an exemplary embodiment of the present invention.

Referring to FIG. 2D, two random access channel groups are provided with different selection probabilities. A first random access channel group is provided with a selection probability of 66%, and a second random access channel group is provided with a selection probability of 33%.

In order to differently set a channel group according to priorities for respective random access signals, channel grouping may be performed in such a manner that some or all of at least two random access channel groups are provided with the same selection probability.

As an example, two random access channel groups are provided with the same selection probability by providing first and second random access channel groups with a selection probability of 50% respectively.

In order to differently set a channel group according to priorities for respective random access signals, channel grouping may be performed in such a manner that at least two random access channel groups partially overlap, some of the random access channel groups are divided into at least two channel subgroups respectively, and the respective channel subgroups are provided with different selection probabilities.

Figure 2E:
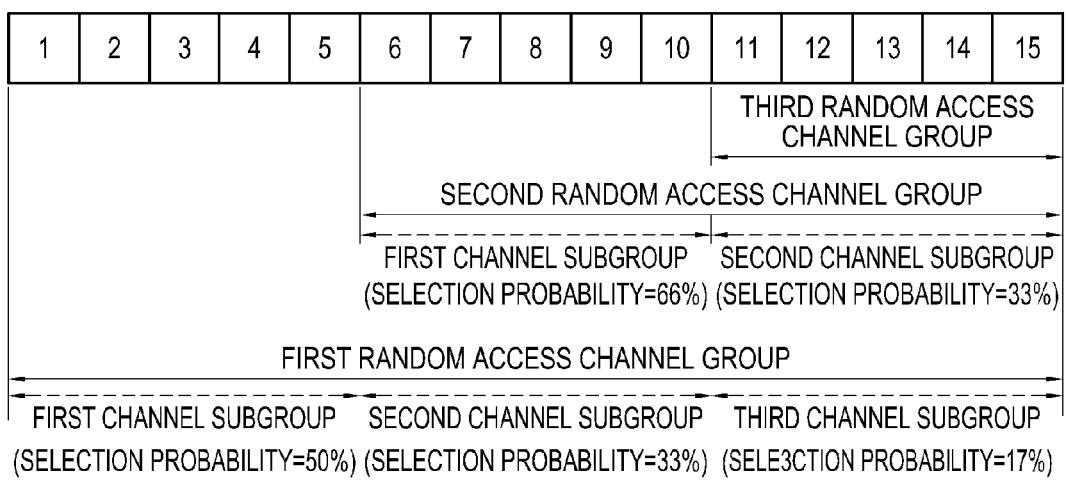

FIG. 2E illustrates a random access method in a wireless communication system, in which a UE uses random access channel groups which includes partially overlapping random access channels and some of which are divided into at least two channel subgroups provided with different selection probabilities respectively according to an exemplary embodiment of the present invention.

Referring to FIG. 2E, three random access channel groups partially overlap each other in such a manner that a first random access channel group partially overlaps second and third random access channel groups, and the second random access channel group partially overlaps the third random access channel group. Also, two random access channel groups are divided with at least two channel subgroups, and the respective channel subgroups are provided with different selection probabilities. The first random access channel group including first to fifteenth random access channels is divided into three channel subgroups, a first channel subgroup of the first random access channel group includes first to fifth random access channels and is provided with a selection probability of ½, a second channel subgroup of the first random access channel group includes sixth to tenth random access channels and is provided with a selection probability of ⅓, and a third channel subgroup of the first random access channel group includes eleventh to fifteenth random access channels and is provided with a selection probability of ⅙.

Further, the second random access channel group including sixth to fifteenth random access channels is divided into two channel subgroups, a first channel subgroup of the second random access channel group includes sixth to tenth random access channels and is provided with a selection probability of ⅔, and a second channel subgroup of the second random access channel group includes eleventh to fifteenth random access channels and is provided with a selection probability of ⅓. Finally, the third random access channel group includes eleventh to fifteenth random access channels.

(5) Channel Selection Method

A method of randomly selecting random access channels from all available random access channels or one random access channel group without overlapping will be discussed.

At least two random access channels are randomly selected from all available random access channels or one random access channel group without overlapping, and at least two random access signals are transmitted over the selected random access channels respectively.

Figure 2F:

FIG. 2F illustrates a random access method in a wireless communication system, in which a UE selects at least two random access channels from all available random access channels or one random access channel group without overlapping according to an exemplary embodiment of the present invention.

Referring to FIG. 2F, a third random access channel and a fifth random access channel are randomly selected from ten available random access channels without overlapping, and two random access signals are transmitted over the selected third and fifth random access channels respectively.

A method of selecting the same number of random access channels from each random access channel group when all available random access channels are grouped into at least two random access channel groups will be discussed.

When all available random access channels are grouped into at least two random access channel groups, at least two random access channels are randomly selected by selecting the same number of random access channels from each random access channel group, and at least two random access signals are transmitted over the selected at least two random access channels respectively.

If it is not possible to select the same number of random access channels from each random access channel group, then the same number of random access channels are randomly selected from each random access channel group up to the maximum number of random access channels that can be selected simultaneously from all the random access channel groups, and the remaining random access channels are randomly selected from some of the random access channel groups one by one without overlapping the already-selected random access channels or are randomly selected from all available random access channels without overlapping the already-selected random access channels.

Figure 2G:
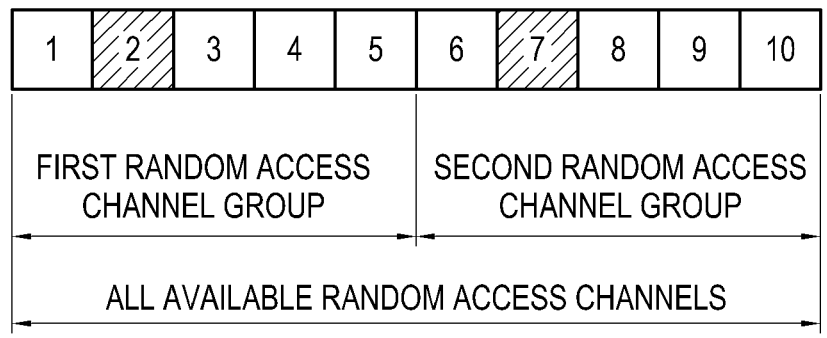

FIG. 2G illustrates a random access method in a wireless communication system, in which a UE selects the same number of random access channels from each random access channel group according to an exemplary embodiment of the present invention.

Referring to FIG. 2G, when all available random access channels are grouped into first and second random access channel groups, two random access channels are selected by selecting a second random access signal from the first random access channel group and selecting a seventh random access channel from the second random access channel group, and two random access signals are transmitted over the selected random access channels respectively.

As an example, when three random access signals are transmitted, one random access channel is randomly selected from the first random access channel group, another random access channel is randomly selected from the second random access channel group, and the other random access channel is randomly selected from random access channels of the first or second random access channel group, other than the already-selected random access channel.

If four random access signals are transmitted, then two random access channels are selected from the first random access channel group, and two random access channels are selected from the second random access channel group.

A method of selecting at least two random access channels when all available random access channels are grouped into at least two random access channel groups and the respective random access channel groups have different selection probabilities will be discussed.

When all available random access channels are grouped into at least two random access channel groups, and the respective random access channel groups have different selection probabilities, at least two random access channels are randomly selected from all the available random access channels without overlapping according to the selection probabilities provided to the respective random access channel groups, and at least two random access signals are transmitted over the selected random access channels respectively.

Figure 2H:
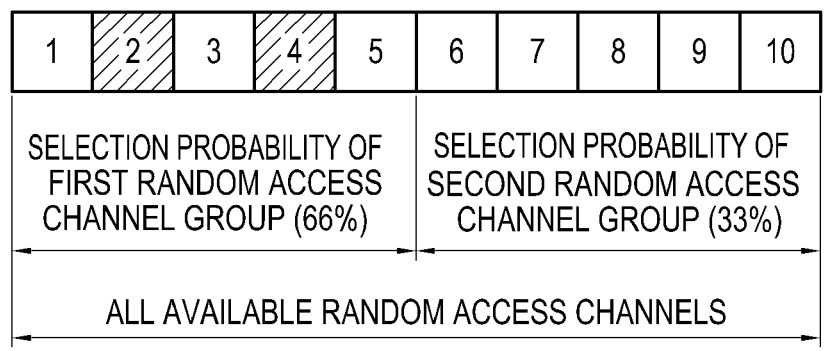

FIG. 2H illustrates a random access method in a wireless communication system, in which a UE selects at least two random access channels from at least two random access channel groups provided with different selection probabilities according to an exemplary embodiment of the present invention.

Referring to FIG. 2H, when two random access signals are transmitted, second and fourth random access channels are selected by randomly selecting two random access signals from a first random access channel group with a selection probability of ⅔ and from a second random access channel group with a selection probability of ⅓, and the two random access signals are transmitted over the selected second and fourth random access channels respectively.

A method of selecting at least two random access channels only from a specific random access channel group when all available random access channels are grouped into at least two random access channel groups will be discussed.

When all available random access channels are grouped into at least two random access channel groups, at least two random access channels are randomly selected only from at least one specific random access channel group without overlapping, and at least two random access signals are transmitted over the selected random access channels respectively.

Figure 2I:
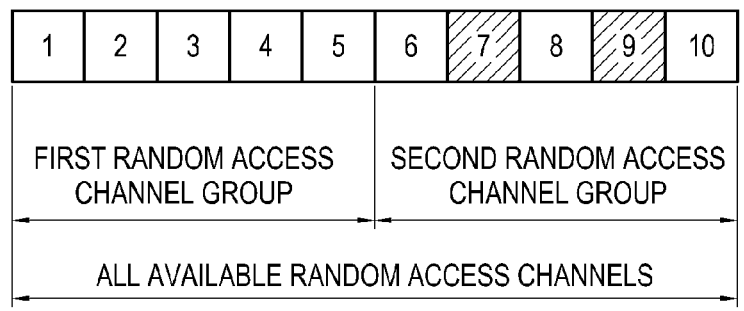

FIG. 2I illustrate a random access method in a wireless communication system, in which a UE selects at least two random access channels only from at least one specific random access channel group according to an exemplary embodiment of the present invention.

Referring to FIG. 2I, when two random access signals are transmitted, seventh and ninth random access channels are selected by randomly selecting two random access channels only from a second random access channel group without overlapping, and the two random access signals are transmitted over the selected seventh and ninth random access channels respectively.

A method of selecting at least two random access channels from different random access channel groups in order to transmit at least two random access signals with different priorities when all available random access channels are grouped into at least two random access channel groups will be discussed.

When all available random access channels are grouped into at least two random access channel groups, at least two random access channels are selected from different random access channel groups in order to transmit at least two random access signals with different priorities, and the at least two random access signals are transmitted over the selected at least two random access channels respectively.

As an example, when two random access signals are transmitted, a random access channel for transmitting a first random access signal with the first priority is selected from a first random access channel group, a random access channel for transmitting a second random access signal with the second priority is selected from a second random access channel group, and the two random access signals are transmitted over the selected random access channels respectively.

A method of selecting at least two random access channels from the same random access channel group in order to transmit some of at least two random access signals with different priorities when all available random access channels are grouped into at least two random access channel groups will be discussed.

When all available random access channels are grouped into at least two random access channel groups, at least two random access channels are selected from the same random access channel groups in order to transmit some of at least two random access signals with different priorities, and the some of the at least two random access signals are transmitted over the selected at least two random access channels respectively.

As an example, when three random access signals are transmitted, a random access channel for transmitting a first random access signal with the first priority and a second random access signal with the second priority respectively is selected from a first random access channel group, a random access channel for transmitting a third random access signal with the third priority is selected from a second random access channel group, and the three random access signals are transmitted over the selected random access channels respectively.

A method of selecting at least two random access channels in order to transmit at least two random access signals with different priorities when all available random access channels are grouped into at least two mutually orthogonal random access channel groups will be discussed.

When all available random access channels are grouped into at least two mutually orthogonal random access channel groups, at least two random access channels are randomly selected from random access channel groups corresponding to respective priorities in order to transmit at least two random access signals with different priorities, and the at least two random access signals are transmitted over the selected at least two random access channels respectively.

Figure 2J:
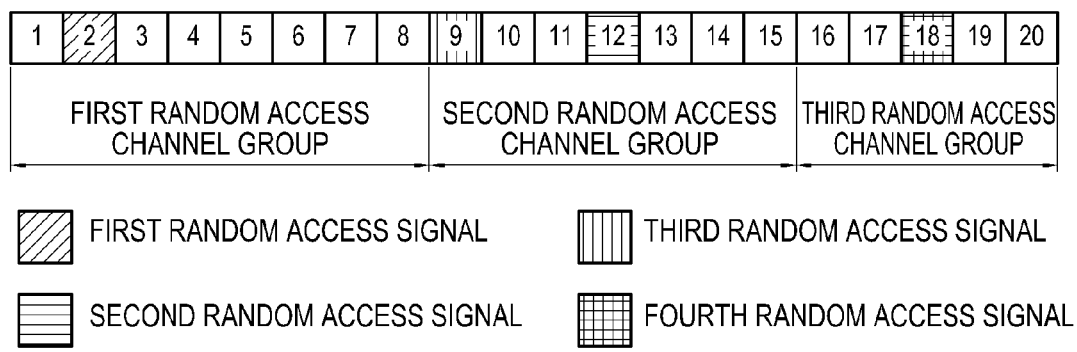

FIG. 2J illustrates a random access method in a wireless communication system, in which a UE selects at least two random access channels from mutually orthogonal random access channel groups according to an exemplary embodiment of the present invention.

Referring to FIG. 2J, when a UE transmits four random access signals by using random access channel groups including mutually orthogonal random access channels, it transmits a first random access signal with the first priority over a second random access channel selected from a first random access channel group including first to eighth random access channels. Further, the UE transmits second and third random access signals with the second priority over ninth and twelfth random access channels respectively, which are selected from a second random access channel group including ninth to fifteenth random access channels. Further, the UE transmits a fourth random access signal with the third priority over an eighteenth random access channel selected from a third random access channel group including sixteenth to twentieth random access channels.

A method of selecting at least two random access channels in order to transmit at least two random access signals with different priorities when all available random access channels are grouped into at least two random access channel groups including partially overlapping random access channels will be discussed.

When all available random access channels are grouped into at least two random access channel groups including partially overlapping random access channels, at least two random access channels are randomly selected from random access channel groups corresponding to respective priorities in order to transmit at least two random access signals with different priorities, and the at least two random access signals are transmitted over the selected at least two random access channels respectively.

Figure 2K:
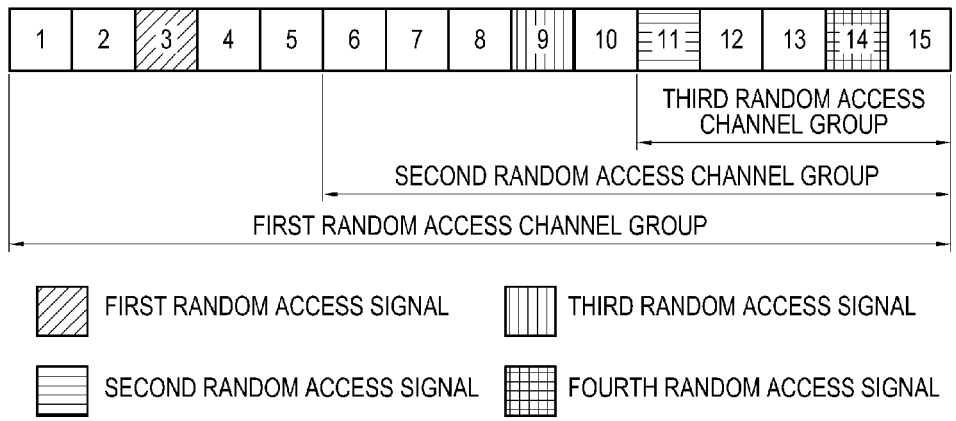

FIG. 2K illustrates a random access method in a wireless communication system, in which a UE uses random access channel groups including partially overlapping random access channels according to an exemplary embodiment of the present invention.

Referring to FIG. 2K, when a UE transmits four random access signals by using random access channel groups including partially overlapping random access channels, it transmits a first random access signal with the first priority over a third random access channel randomly selected from a first random access channel group including first to fifteenth random access channels. Further, the UE transmits second and third random access signals with the second priority over ninth and eleventh random access channels respectively, which are randomly selected from a second random access channel group including sixth to fifteenth random access channels. Further, the UE transmits a fourth random access signal with the third priority over a fourteenth random access channel randomly selected from a third random access channel group including eleventh to fifteenth random access channels.

A method of selecting at least two random access channels in order to transmit at least two random access signals with different priorities when all available random access channels are grouped into at least two random access channel groups including partially overlapping random access channels, some of the random access channel groups are divided into at least two channel subgroups respectively, and the respective channel subgroups are provided with different selection probabilities will be discussed.

When all available random access channels are grouped into at least two random access channel groups including partially overlapping random access channels, some of the random access channel groups are divided into at least two channel subgroups respectively, and the respective channel subgroups are provided with different selection probabilities, at least two random access channels are randomly selected from random access channel groups corresponding to respective priorities according to the selection probabilities provided to the respective random access channel groups in order to transmit at least two random access signals with different priorities, and the at least two random access signals are transmitted over the selected at least two random access channels respectively.

Figure 2L:
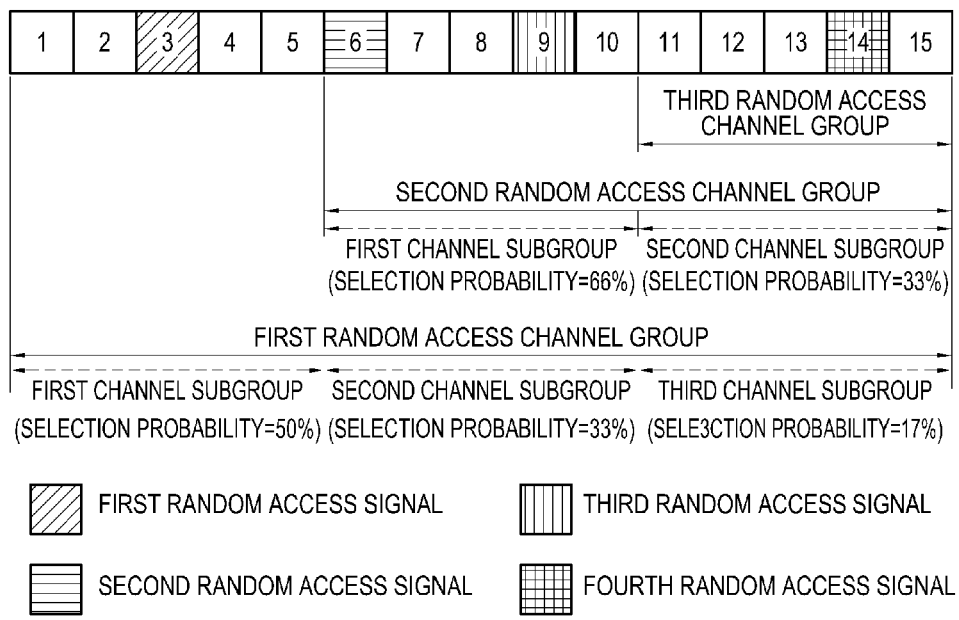

FIG. 2L illustrates a random access method in a wireless communication system, in which a UE selects at least two random access channels from random access channel groups which includes partially overlapping random access channels and some of which are divided into at least two channel subgroups provided with different selection probabilities respectively according to an exemplary embodiment of the present invention.

Referring to FIG. 2L, when a UE transmits four random access signals by using random access channel groups which include partially overlapping random access channels and some of which are divided into at least two channel subgroups provided with different selection probabilities respectively, it transmits a first random access signal with the first priority over one random access channel (i.e., a third random access channel), which is randomly selected from a first channel subgroup of a first random access channel group including first to fifteenth random access channels with a selection probability of ½, from a second channel subgroup of the first random access channel group with a selection probability of ⅓, and from a third channel subgroup of the first random access channel group with a selection probability of ⅙. Further, the UE transmits second and third random access signals with the second priority over two random access channels (sixth and ninth random access channels) respectively, which are randomly selected from a first channel subgroup of a second random access channel group including sixth to fifteenth random access channels with a selection probability of ⅔ and from a second channel subgroup of the second random access channel group with a selection probability of ⅓. Further, the UE transmits a fourth random access signal with the third priority over one random access channel (i.e., a fourteenth random access channel) randomly selected from a third random access channel group including eleventh to fifteenth random access channels.

A method of selecting a plurality of random access frames will be discussed below.

At least two random access signals are transmitted using at least two random access frames. In selecting the at least two random access frames, of course, the same random access channel or different random access channels may be selected from the respective random access frames, and at least two random access channels may be selected from each random access frame.

Figures 2M, 3:
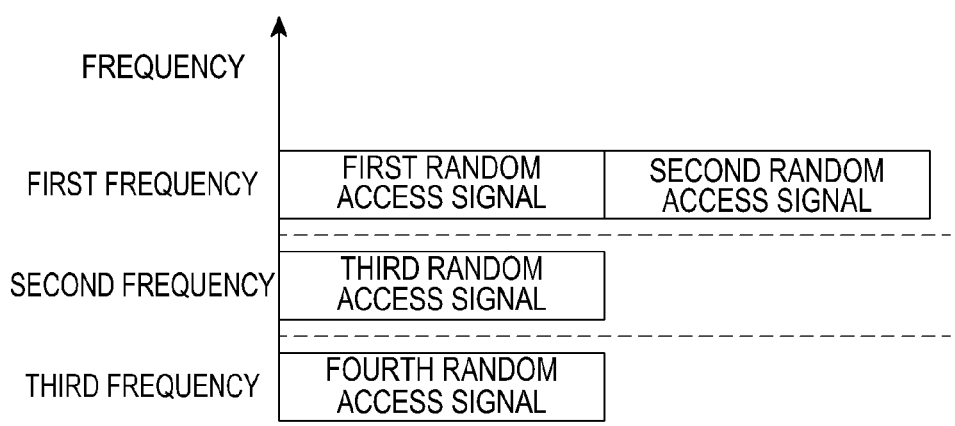

FIG. 2M illustrates a random access method in a wireless communication system, in which a UE selects random access channels for at least two random access signals by using a plurality of random access frames according to an exemplary embodiment of the present invention.

Referring to FIG. 2M, a UE selects two random access signals by selecting one different random access signal from each of two random access frames, that is, selecting a seventh random access channel from a first random access frame and selecting a ninth random access channel from a second random access frame, and transmits at least two random access signals over the selected two random access channels respectively.

In the fourth place, a UE transmits at least two random access signals with different priorities, among which a frequency is set differently.

FIG. 3 illustrates a random access method in which a UE sets different frequencies for random access signals according to priorities and transmits the random access signals through the corresponding frequencies in a wireless communication system according to an exemplary embodiment of the present invention.

Referring to FIG. 3, when a UE transmits four random access signals, it transmits first and second random access signals with the first priority through a first frequency, transmits a third random access signal with the second priority through a second frequency, and transmits a fourth random access signal with the third priority through a third frequency. In transmitting the first and second random access signals with the same priority, a code for each signal is set differently so as for a target communication node for random access to distinguish between them. In this way, a UE can transmit at least two random access signals while differently setting a frequency according to the priorities for the respective random access signals. With regard to this, a UE may transmit at least two random access signals with the same priority by using the same frequency as a first random access parameter and by differently setting at least one second random access parameter among the random access signals with the same priority. Here, the second random access parameter includes at least one of a RAT, a target communication node, a channel (e.g., time, code, antenna, etc.), a channel group, power, transmission order, a modulation parameter, a coding parameter, a length, a bandwidth, a processing gain, and included information.

In the fifth place, a UE transmits at least two random access signals with different priorities, among which a time is set differently.

Figure 4:
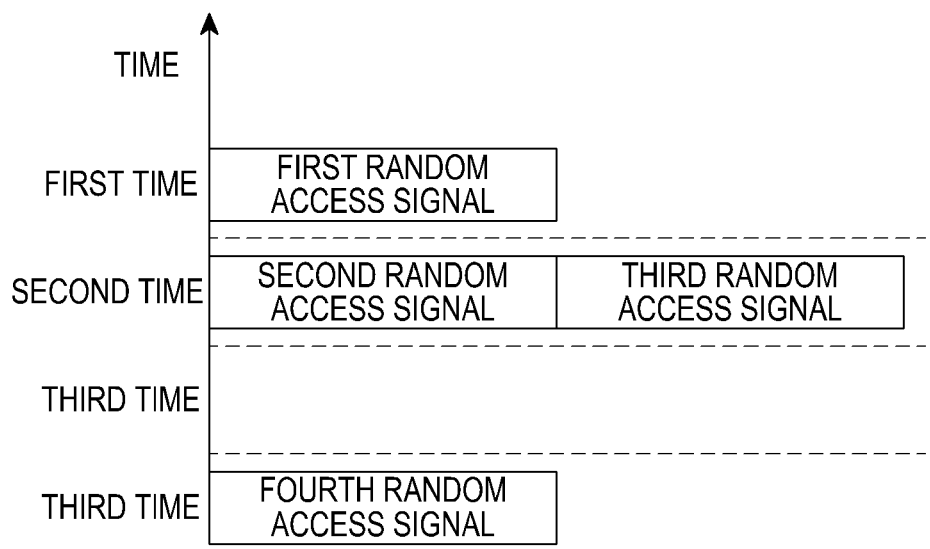
FIG. 4 is a view for explaining a random access method in which a UE sets different times for random access signals according to priorities and transmits the random access signals at the corresponding times in a wireless communication system according to an exemplary embodiment of the present invention.

FIG. 4 illustrates a random access method in which a UE sets different times for random access signals according to priorities and transmits the random access signals at the corresponding times in a wireless communication system according to an exemplary embodiment of the present invention.

Referring to FIG. 4, when a UE transmits four random access signals, it transmits a first random access signal with the first priority at a first time, transmits second and third random access signals with the second priority at a second time, and transmits a fourth random access signal with the fourth priority at a fourth time. In transmitting the second and third random access signals with the same priority, a frequency for each signal is set differently so as for a target communication node for random access to distinguish between them. In this way, a UE can transmit at least two random access signals while differently setting a time according to the priorities for the respective random access signals. With regard to this, a UE may transmit at least two random access signals with the same priority by using the same time as a first random access parameter and by differently setting at least one second random access parameter among the random access signals with the same priority. Here, the second random access parameter includes at least one of a RAT, a target communication node, a channel (e.g., frequency, code, antenna, etc.), a channel group, power, transmission order, a modulation parameter, a coding parameter, a length, a bandwidth, a processing gain, and included information.

In the sixth place, a UE transmits at least two random access signals with different priorities, among which a code is set differently.

Figure 5:
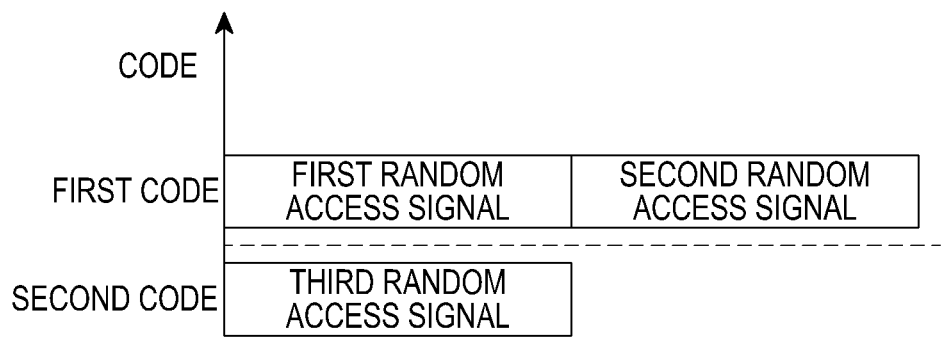
FIG. 5 is a view for explaining a random access method in which a UE sets different codes for random access signals according to priorities and transmits the random access signals through the corresponding codes in a wireless communication system according to an exemplary embodiment of the present invention.

FIG. 5 illustrates a random access method in which a UE sets different codes for random access signals according to priorities and transmits the random access signals through the corresponding codes in a wireless communication system according to an exemplary embodiment of the present invention.

Referring to FIG. 5, when a UE transmits three random access signals, it transmits first and second random access signals with the first priority through a first code and transmits a third random access signal with the second priority through a second code. In transmitting the first and second random access signals with the same priority, power for each signal is set differently so as for a target communication node for random access to distinguish between them. In this way, a UE can transmit at least two random access signals while differently setting a code according to the priorities for the respective random access signals. With regard to this, a UE may transmit at least two random access signals with the same priority by using the same code as a first random access parameter and by differently setting at least one second random access parameter among the random access signals with the same priority. Here, the second random access parameter includes at least one of a RAT, a target communication node, a channel (e.g., frequency, time, antenna, etc.), a channel group, power, transmission order, a modulation parameter, a coding parameter, a length, a bandwidth, a processing gain, and included information.

In the seventh place, a UE transmits at least two random access signals with different priorities, among which an antenna is set differently.

When a UE transmits three random access signals, it transmits first and second random access signals with the first priority through a first antenna and transmits a third random access signal with the second priority through a second antenna. In transmitting the first and second random access signals with the same priority, a frequency for each signal is set differently so as for a target communication node for random access to distinguish between them. In this way, a UE can transmit at least two random access signals while differently setting an antenna according to the priorities for the respective random access signals. With regard to this, a UE may transmit at least two random access signals with the same priority by using the same antenna as a first random access parameter and by differently setting at least one second random access parameter among the random access signals with the same priority. Here, the second random access parameter includes at least one of a RAT, a target communication node, a channel (e.g., frequency, time, code, etc.), a channel group, power, transmission order, a modulation parameter, a coding parameter, a length, a bandwidth, a processing gain, and included information.

In the eighth place, a UE transmits at least two random access signals with different priorities, among which power is set differently.

When a UE transmits four random access signals, it allocates a transmission power of 50 mW to first and second random access signals with the first priority and transmits the first and second random access signals with the allocated transmission power, allocates a transmission power of 30 mW to a third random access signal with the second priority and transmits the third random access signal with the allocated transmission power, and allocates a transmission power of 20 mW to a fourth random access signal with the third priority and transmits the fourth random access with the allocated transmission power. In transmitting the first and second random access signals with the same priority, a channel group for each signal is set differently so as for a target communication node for random access to distinguish between them. In this way, a UE can transmit at least two random access signals while differently setting transmission power according to the priorities for the respective random access signals. With regard to this, a UE may transmit at least two random access signals with the same priority by using the same transmission power as a first random access parameter and by differently setting at least one second random access parameter among the random access signals with the same priority. Here, the second random access parameter includes at least one of a RAT, a target communication node, a channel (e.g., frequency, time, code, antenna, etc.), a channel group, transmission order, a modulation parameter, a coding parameter, a length, a bandwidth, a processing gain, and included information.

In the ninth place, a UE transmits at least two random access signals with different priorities, among which transmission order is set differently.

Figure 6:
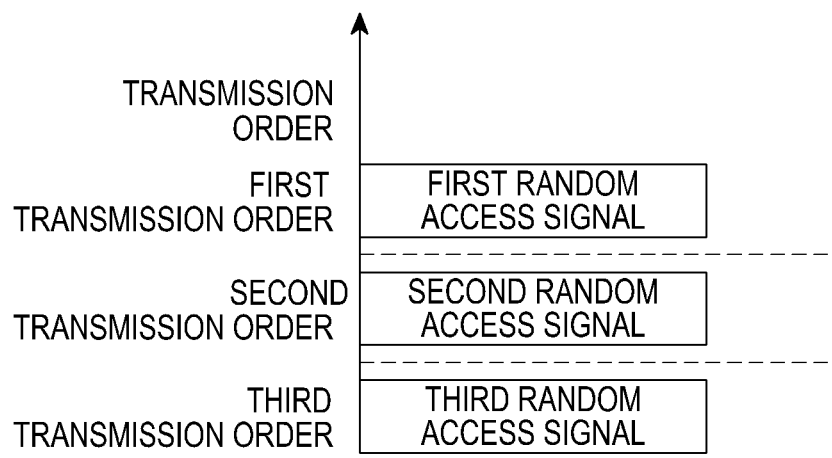
FIG. 6 is a view for explaining a random access method in which a UE sets different transmission orders for random access signals according to priorities and transmits the random access signals in the corresponding transmission orders in a wireless communication system according to an exemplary embodiment of the present invention.

FIG. 6 illustrates a random access method in which a UE sets different transmission orders for random access signals according to priorities and transmits the random access signals in the corresponding transmission orders in a wireless communication system according to an exemplary embodiment of the present invention.

Referring to FIG. 6, when a UE transmits three random access signals, it transmits a first random access signal with the first priority in the first order, transmits a second random access signal with the second priority in the second order, and transmits a third random access signal with the third priority in the third order. In this way, a UE can transmit at least two random access signals while differently setting transmission order according to the priorities for the respective random access signals. With regard to this, a UE may transmit at least two random access signals with the same priority by using the same transmission order as a first random access parameter and by differently setting at least one second random access parameter among the random access signals with the same priority. Here, the second random access parameter includes at least one of a RAT, a target communication node, a channel (e.g., frequency, time, code, antenna, etc.), a channel group, power, a modulation parameter, a coding parameter, a length, a bandwidth, a processing gain, and included information.

In the tenth place, a UE transmits at least two random access signals with different priorities, among which a modulation parameter is set differently.

Modulation parameters for random access signals with different priorities are presented below in Table 1.

TABLE 1

| random access signal | modulation level |
| --- | --- |
| first random access signal | BPSK |
| second random access signal | QPSK |
| third random access signal | 16QAM |
| fourth random access signal | 16QAM |

Referring to Table 1, when a UE transmits four random access signals, it modulates a first random access signal with the first priority into a BPSK signal and transmits the modulated first random access signal, modulates a second random access signal with the second priority into a QPSK signal and transmits the modulated second random access signal, and modulates third and fourth random access signals with the third priority into 16QAM signals and transmits the modulated third and fourth random access signals. In transmitting the third and fourth random access signals with the same priority, a frequency for each signal is set differently so as for a target communication node for random access to distinguish between them. Here, the BPSK, QPSK, and 16QAM are only illustrative of possible modulation schemes, and it is obvious that various other modulation schemes, such as Amplitude Shift Keying (ASK), Frequency Shift Keying (FSK), Phase Shift Keying (PSK), Quadrature Amplitude Keying (QAM), and Pulse Amplitude Modulation (PAM), may also be employed. In this way, a UE can transmit at least two random access signals while differently setting a modulation parameter according to the priorities for the respective random access signals. With regard to this, a UE may transmit at least two random access signals with the same priority by using the same modulation parameter as a first random access parameter and by differently setting at least one second random access parameter among the random access signals with the same priority. Here, the second random access parameter includes at least one of a RAT, a target communication node, a channel (e.g., frequency, time, code, antenna, etc.), a channel group, power, transmission order, a coding parameter, a length, a bandwidth, a processing gain, and included information.

In the eleventh place, a UE transmits at least two random access signals with different priorities, among which a coding parameter is set differently.

Coding parameters for random access signals with different priorities are presented below in Table 2.

TABLE 2

| random access signal | coding rate |
| --- | --- |
| first random access signal | 1/3 |
| second random access signal | 1/2 |
| third random access signal | 2/3 |
| fourth random access signal | 4/5 |

Referring to Table 2, when a UE transmits four random access signals, it encodes a first random access signal with the first priority by using a coding rate of 1/3 and transmits the encoded first random access signal, encodes a second random access signal with the second priority by using a coding rate of 1/2 and transmits the encoded second random access signal, encodes a third random access signal with the third priority by using a coding rate of 3/4 and transmits the encoded third random access signal, and encodes a fourth random access signal with the fourth priority by using a coding rate of 4/5 and transmits the encoded fourth random access signal. Here, the coding rates of 1/3, 1/2, 3/4, and 4/5 are only illustrative of possible coding rates, and it is obvious that various other coding rates may also be employed, and various coding schemes using convolutional codes, turbo codes, Low-Density Parity-Check (LDPC) codes, Reed-Solomon codes, and the like may be employed. In this way, a UE can transmit at least two random access signals while differently setting a coding parameter according to the priorities for the respective random access signals. With regard to this, a UE may transmit at least two random access signals with the same priority by using the same modulation parameter as a first random access parameter and by differently setting at least one second random access parameter among the random access signals with the same priority. Here, the second random access parameter includes at least one of a RAT, a target communication node, a channel (e.g., frequency, time, code, antenna, etc.), a channel group, power, transmission order, a modulation parameter, a length, a bandwidth, a processing gain, and included information.

In the twelfth place, a UE transmits at least two random access signals with different priorities, among which a signal length is set differently.

Figure 7:
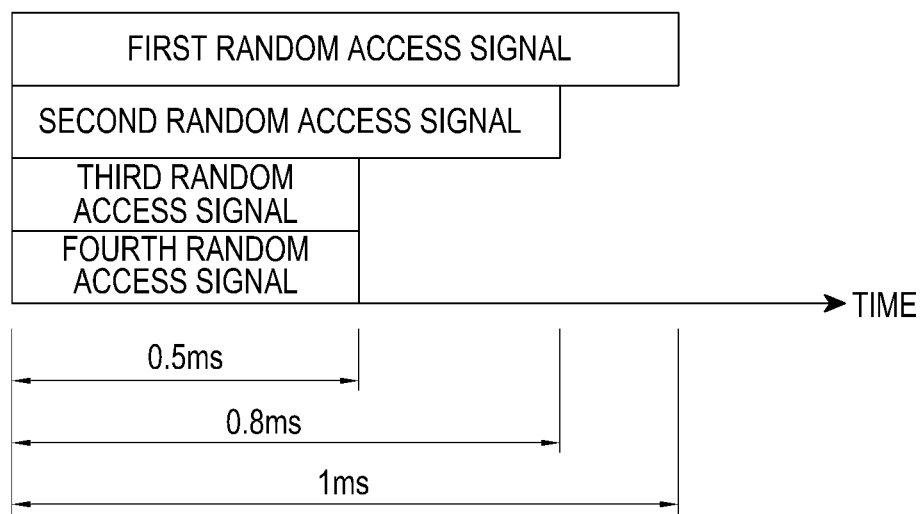
FIG. 7 is a view for explaining a random access method in which a UE sets different lengths for random access signals according to priorities and transmits the random access signals in the form of signals with the corresponding lengths in a wireless communication system according to an exemplary embodiment of the present invention.

FIG. 7 illustrates a random access method in which a UE sets different lengths for random access signals according to priorities and transmits the random access signals in the form of signals with the corresponding lengths in a wireless communication system according to an exemplary embodiment of the present invention.

Referring to FIG. 7, when a UE transmits four random access signals, it transmits a first random access signal with the first priority in the form of a signal with a length of 1 ms, transmits a second random access signal with the second priority in the form of a signal with a length of 0.8 ms, and transmits third and fourth random access signals with the third priority in the form of a signal with a length of 0.5 ms. In transmitting the third and fourth random access signals with the same priority, a code for each signal is set differently so as for a target communication node for random access to distinguish between them. Here, the lengths of 1 ms, 0.8 ms, and 0.5 ms are only illustrative of possible random access signal lengths, and it is obvious that various other types of signal lengths, such as a duration, a bit number, and sequence length, may also be employed. In this way, a UE can transmit at least two random access signals while differently setting a signal length according to the priorities for the respective random access signals. With regard to this, a UE may transmit at least two random access signals with the same priority by using the same signal length as a first random access parameter and by differently setting at least one second random access parameter among the random access signals with the same priority. Here, the second random access parameter includes at least one of a RAT, a target communication node, a channel (e.g., frequency, time, code, antenna, etc.), a channel group, power, transmission order, a modulation parameter, a coding parameter, a bandwidth, a processing gain, and included information.

In the thirteenth place, a UE transmits at least two random access signals with different priorities, among which a bandwidth is set differently.

Figure 8:
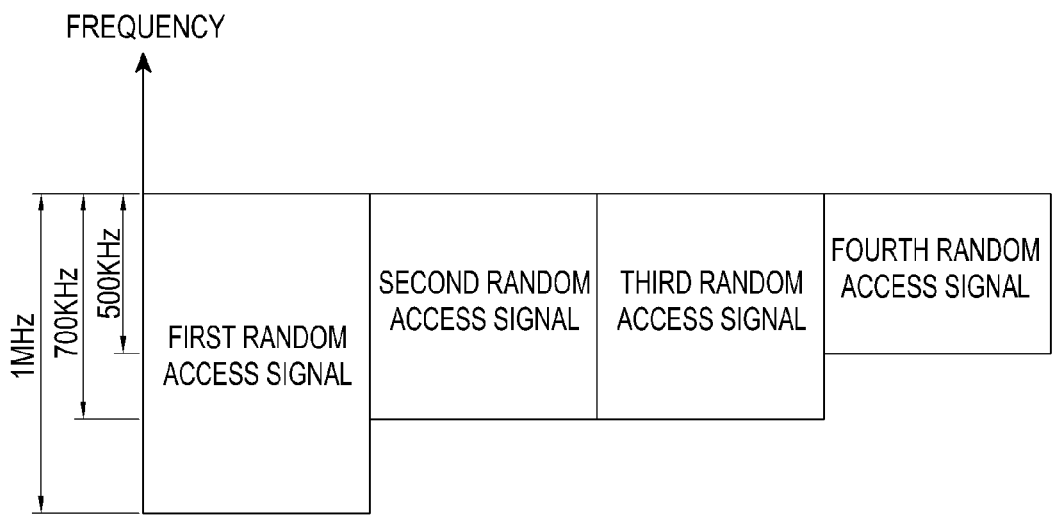
FIG. 8 is a view for explaining a random access method in which a UE sets different bandwidths for random access signals according to priorities and transmits the random access signals in the corresponding bandwidths in a wireless communication system according to an exemplary embodiment of the present invention.

FIG. 8 illustrates a random access method in which a UE sets different bandwidths for random access signals according to priorities and transmits the random access signals in the corresponding bandwidths in a wireless communication system according to an exemplary embodiment of the present invention.

Referring to FIG. 8, when a UE transmits four random access signals, it transmits a first random access signal with the first priority in a bandwidth of 1 MHz, transmits second and third random access signals with the second priority in a bandwidth of 700 kHz, and transmits a fourth random access signal with the third priority in a bandwidth of 500 kHz. In transmitting the second and third random access signals with the same priority, transmission order for each signal is set differently so as for a target communication node for random access to distinguish between them. In this way, a UE can transmit at least two random access signals while differently setting a bandwidth according to the priorities for the respective random access signals. With regard to this, a UE may transmit at least two random access signals with the same priority by using the same bandwidth as a first random access parameter and by differently setting at least one second random access parameter among the random access signals with the same priority. Here, the second random access parameter includes at least one of a RAT, a target communication node, a channel (e.g., frequency, time, code, antenna, etc.), a channel group, power, transmission order, a modulation parameter, a coding parameter, a length, a processing gain, and included information.

In the fourteenth place, a UE transmits at least two random access signals with different priorities, among which processing gain is set differently.

When a UE transmits three random access signals, it transmits a first random access signal with the first priority such that a processing gain of 20 dB is obtained, transmits a second random access signal with the second priority such that a processing gain of 15 dB is obtained, and transmits a third random access signal with the third priority such that a processing gain of 0 dB is obtained. In this way, a UE can transmit at least two random access signals while differently setting a processing gain according to the priorities for the respective random access signals. With regard to this, a UE may transmit at least two random access signals with the same priority by using the same processing gain as a first random access parameter and by differently setting at least one second random access parameter among the random access signals with the same priority. Here, the second random access parameter includes at least one of a RAT, a target communication node, a channel (e.g., frequency, time, code, antenna, etc.), power, transmission order, a modulation parameter, a coding parameter, a length, a bandwidth, and included information.

The processing gain is an indicator of how wide a random access signal transmitted through a spread spectrum technique is spread by a spread code, and is defined by the following equation:

$$G_p = 10 \log_{10}\left(\frac{B_{ss}}{B_s}\right) \quad \text{Equation (3)}$$

where, $B_{SS}$ denotes the bandwidth of a spread signal, and $B_S$ denotes the bandwidth of an original signal.

In the fifteenth place, a UE transmits at least two random access signals with different priorities, among which included information is set differently.

Information included in random access signals with different priorities are presented below in Table 3.

TABLE 3

| random access signal | included information |
|---|---|
| first random access signal | ID, required amount of resources |
| second random access signal | ID |
| third random access signal | none |
| fourth random access signal | none |

Referring to Table 3, when a UE transmits four random access signals, it transmits a first random access signal with the first priority while including ID information and required resource amount information therein, transmits a second random access signal with the second priority while including ID information therein, and transmits third and fourth random access signals with the third priority without any included information In transmitting the third and fourth random access signals with the same priority, a processing gain for each signal is set differently so as for a target communication node for random access to distinguish between them. Here, the ID and the required amount of resources are only illustrative of includable information, and it is obvious that various other information, such as required service information and UE access information (handover, initial access, etc.), may also be employed. In this way, a UE can transmit at least two random access signals while differently setting included information according to the priorities for the respective random access signals. With regard to this, a UE may transmit at least two random access signals with the same priority by using the same included information as a first random access parameter and by differently setting at least one second random access parameter among the random access signals with the same priority. Here, the second random access parameter includes at least one of a RAT, a target communication node, a channel (e.g., frequency, time, code, antenna, etc.), a channel group, power, transmission order, a modulation parameter, a coding parameter, a length, a bandwidth, and a processing gain.

In the sixteenth place, a UE transmits at least two random access signals to at least one target communication node according to included information. Here, whether or not information is included (or non-included) is considered for each random access signal. In the following, a description will be given of examples where a UE transmits at least two random access signals in consideration of whether or not information is included in the random access signals.

Figure 9:
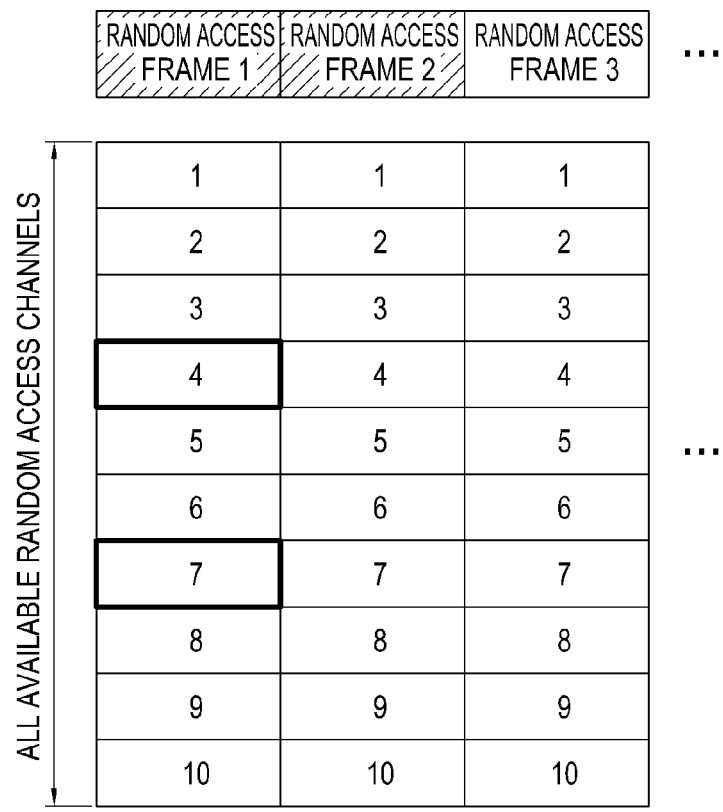
FIG. 9 is a view for explaining a random access method in which a UE transmits two random access signals with no information in a wireless communication system according to an exemplary embodiment of the present invention.

FIG. 9 illustrates a random access method in which a UE transmits two random access signals with no information in a wireless communication system according to an exemplary embodiment of the present invention. That is, in transmitting at least two random access signals, a UE does not include any information in the random access signals.

Referring to FIG. 9, two random access signals with no information are transmitted over fourth and seventh random access channels respectively, which are selected from random access Frame 1.

Figure 10:
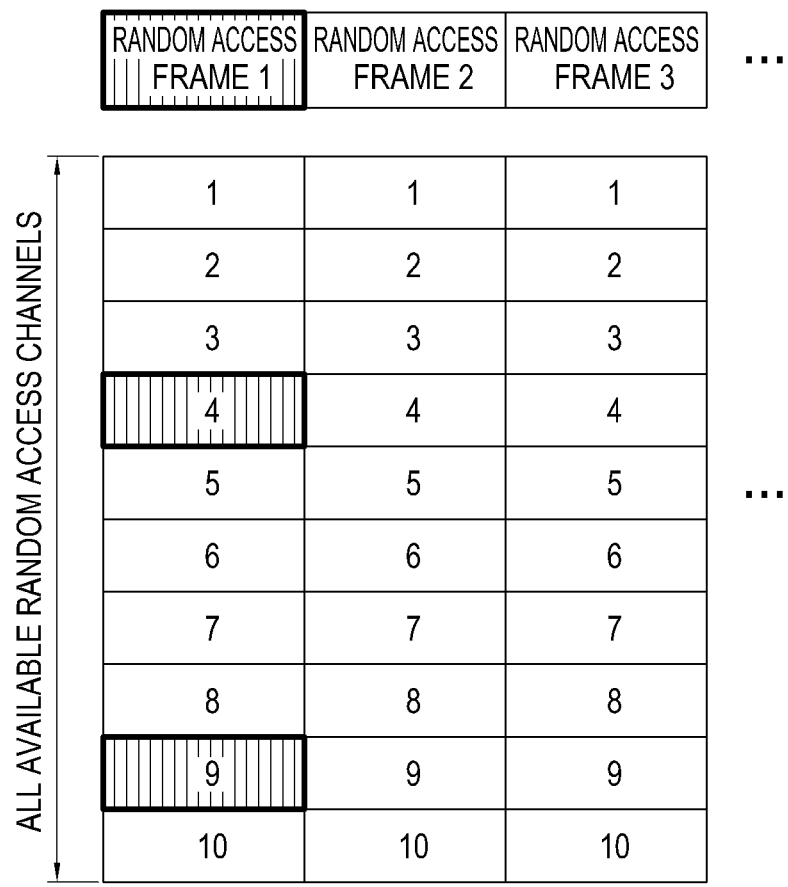
FIG. 10 is a view for explaining a random access method in which a UE transmits two random access signals with the same information in a wireless communication system according to an exemplary embodiment of the present invention.

FIG. 10 illustrates a random access method in which a UE transmits two random access signals with the same information in a wireless communication system according to an exemplary embodiment of the present invention. For example, in transmitting at least two random access signals, a UE includes the same information in the random access signals respectively.

Referring to FIG. 10, two random access signals with the same information are transmitted over fourth and ninth random access channels respectively, which are selected from random access Frame 1.

Figure 11:
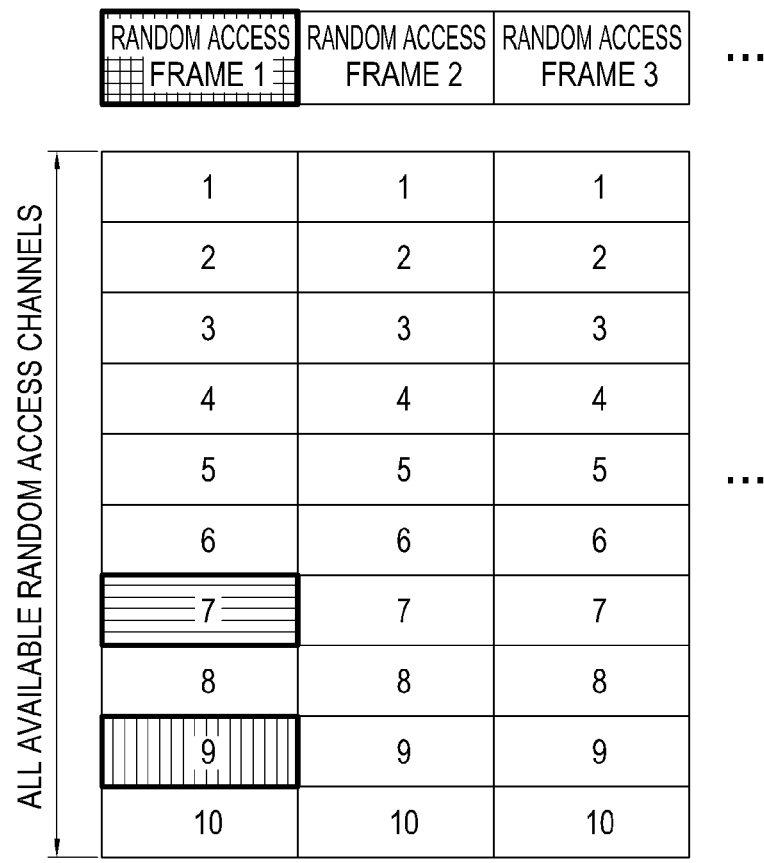
FIG. 11 is a view for explaining a random access method in which a UE transmits two random access signals with different information in a wireless communication system according to an exemplary embodiment of the present invention.

FIG. 11 illustrates a random access method in which a UE transmits two random access signals with different information in a wireless communication system according to an exemplary embodiment of the present invention. That is, in transmitting at least two random access signals, a UE includes different information in the random access signals respectively.

By transmitting random access signals with different information, additional information on a UE can be provided to a target communication node. As an example, a UE can take priority of resource allocation by providing information indicating handover access to a target communication node, or can provide a target communication node with additional resource request information for control and/or data message exchange.

Referring to FIG. 11, two random access signals with different information are transmitted over seventh and ninth random access channels respectively, which are selected from random access Frame 1.

Next, reference will be made in detail to step 200 of FIG. 1, in which the UE transmits the at least two random access signals with their own priorities, with reference to FIGS. 12 to 25.

In order to perform random access to at least one target communication node of at least one RAT, a UE according to exemplary embodiments of the present invention generates at least two random access signals with their own priorities to be transmitted to the at least one target communication node of at least one RAT by determining random access parameters and priorities for random access signals in consideration of at least one random access condition. Here, the target communication node includes one or more of a BS, a relay, a femto cell BS, and the like. For the convenience of description, the following will address examples where in order to perform random access, a UE determines random access parameters and priorities for random access signals in such a manner as to transmit three or less random access signals to three or less target communication nodes. However, it will be apparent to those skilled in the art that a UE according to exemplary embodiments of the present invention may transmit a plurality of random access signals to four or more target communication nodes, and may also transmit four or more random access signals to one target communication node.

Figure 12:
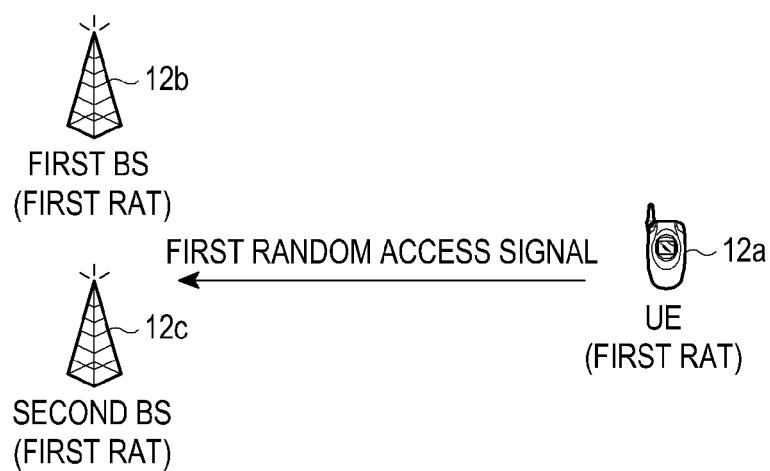
FIG. 12 is a view for explaining a random access method in which a UE transmits one random access signal to two target communication nodes in a wireless communication system according to an exemplary embodiment of the present invention.

FIG. 12 illustrates a random access method in which a UE transmits one random access signal to two target communication nodes in a wireless communication system according to an exemplary embodiment of the present invention. That is, a UE determines random access parameters and priorities for random access signals in such a manner as to transmit at least one random access signal to two target communication nodes.

Referring to FIG. 12, a UE 12a supporting a first RAT determines random access parameters and priorities for random access signals in such a manner as to simultaneously transmit one random access signal to a first BS 12b and a second BS 12c of the first RAT. In this way, a UE transmits at least one random access signal to two target communication nodes of one active RAT.

Figure 13:
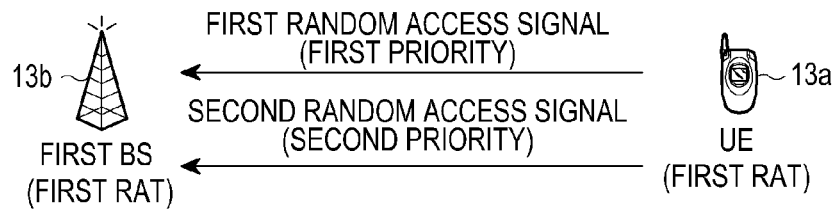
FIG. 13 is a view for explaining a random access method in which a UE transmits two random access signals to one target communication node in a wireless communication system according to an exemplary embodiment of the present invention.

FIG. 13 illustrates a random access method in which a UE transmits two random access signals to one target communication node in a wireless communication system according to an exemplary embodiment of the present invention. That is, a UE determines random access parameters and priorities for random access signals in such a manner as to transmit at least two random access signals to one target communication node.

Referring to FIG. 13, a UE 13a supporting a first RAT determines random access parameters and priorities for random access signals in such a manner as to transmit a first random access signal with the first priority and a second random access signal with the second priority to a first BS 13b. For a UE using one active RAT, a step of determining the first RAT as a target RAT for random access may be included or omitted in the random access method. In this way, a UE transmits at least two random access signals to one target communication node of one active RAT.

Figure 14:
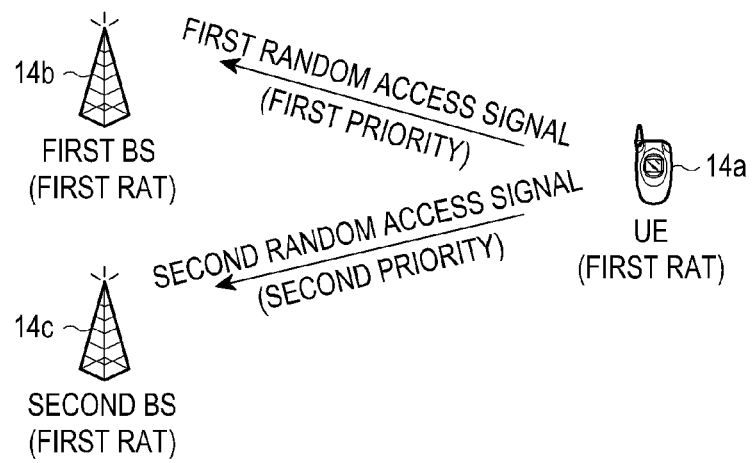
FIG. 14 is a view for explaining a random access method in which a UE transmits one random access signal to each of two target communication nodes with a same Radio Access Technology (RAT) in a wireless communication system according to an exemplary embodiment of the present invention.

FIG. 14 illustrates a random access method in which a UE transmits one random access signal to each of two target communication nodes with the same RAT in a wireless communication system according to an exemplary embodiment of the present invention. That is, a UE determines random access parameters and priorities for random access signals in such a manner as to transmit one random access signal to each of at least two target communication nodes.

Referring to FIG. 14, a UE 14a supporting a first RAT determines random access parameters and priorities for random access signals in such a manner as to transmit a first random access signal with the first priority to a first BS 14b of the first RAT and transmit a second random access signal with the second priority to a second BS 14c of the first RAT. For a UE using one active RAT, a step of determining the first RAT as a target RAT for random access may be included or omitted in the random access method. In this way, a UE transmits one random access signal to each of at least two target communication nodes with the same RAT. With regard to this, a UE may have a plurality of modems for access to a plurality of communication nodes.

Figure 15:
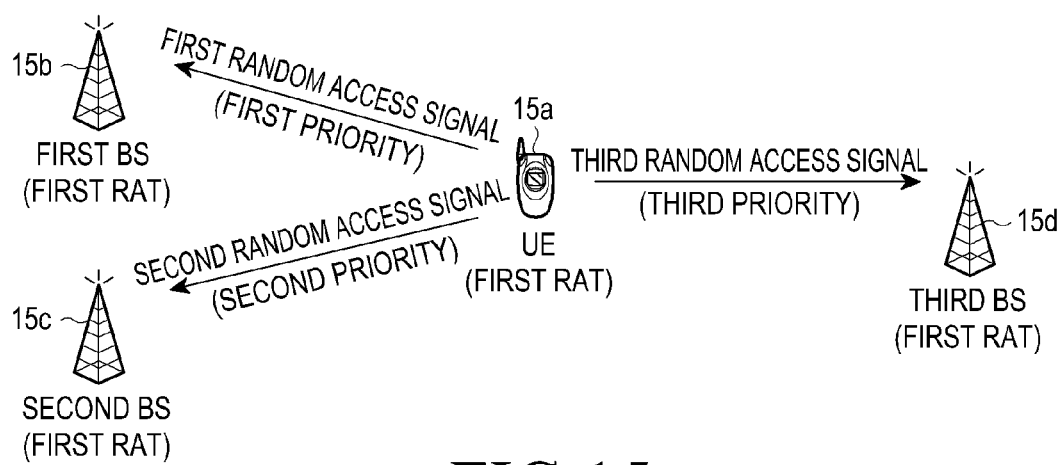
FIG. 15 is a view for explaining a random access method in which a UE transmits one random access signal to each of three target communication nodes with a same RAT in a wireless communication system according to an exemplary embodiment of the present invention.

FIG. 15 illustrates a random access method in which a UE transmits one random access signal to each of three target communication nodes with the same RAT in a wireless communication system according to an exemplary embodiment of the present invention. That is, a UE determines random access parameters and priorities for random access signals in such a manner as to transmit one random access signal to each of at least two target communication nodes.

Referring to FIG. 15, a UE 15a supporting a first RAT determines random access parameters and priorities for random access signals in such a manner as to transmit a first random access signal with the first priority to a first BS 15b of the first RAT, transmit a second random access signal with the second priority to a second BS 15c of the first RAT, and transmit a third random access signal with the third priority to a third BS 15d of the first RAT. For a UE using one active RAT, a step of determining the first RAT as a target RAT for random access may be included or omitted in the random access method. In this way, a UE transmits one random access signal to each of at least three target communication nodes with the same RAT. With regard to this, a UE may have a plurality of modems for access to a plurality of communication nodes.

Figure 16:
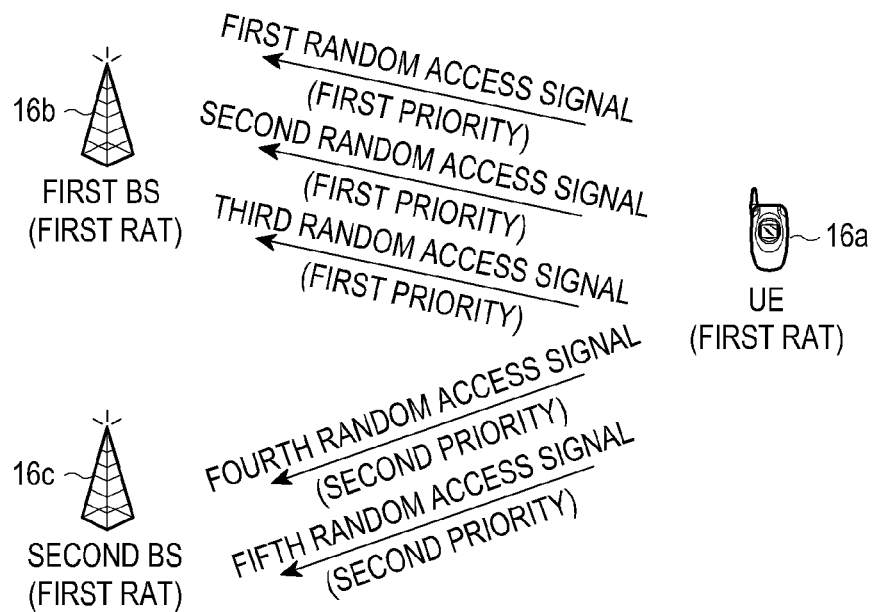
FIG. 16 is a view for explaining a random access method in which a UE transmits a plurality of random access signals to each of two target communication nodes with a same RAT in a wireless communication system according to an exemplary embodiment of the present invention.
Figure 17:
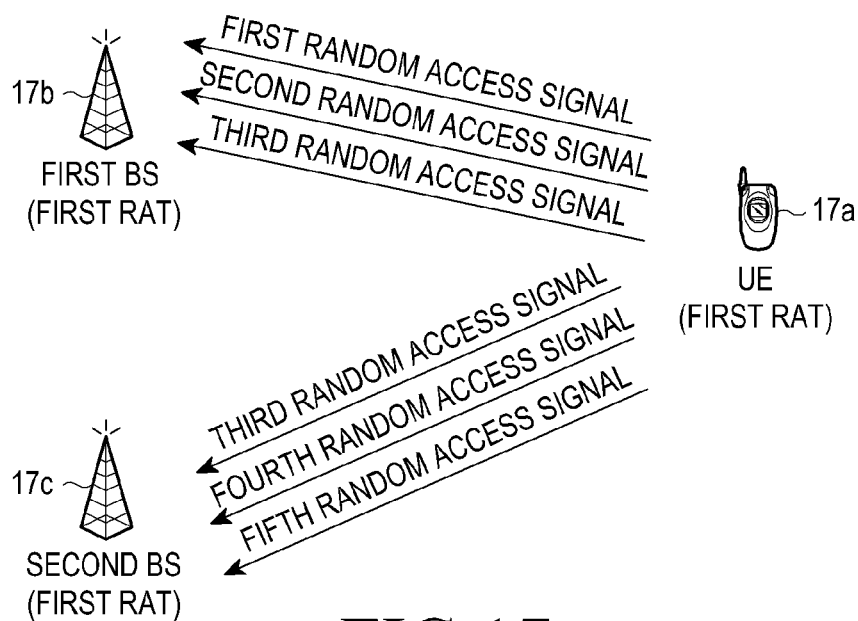
FIG. 17 is a view for explaining a random access method in which a UE transmits a plurality of random access signals to each of two target communication nodes with a same RAT and transmits the one same random access signal to the two target communication nodes in a wireless communication system according to an exemplary embodiment of the present invention.
Figure 18:
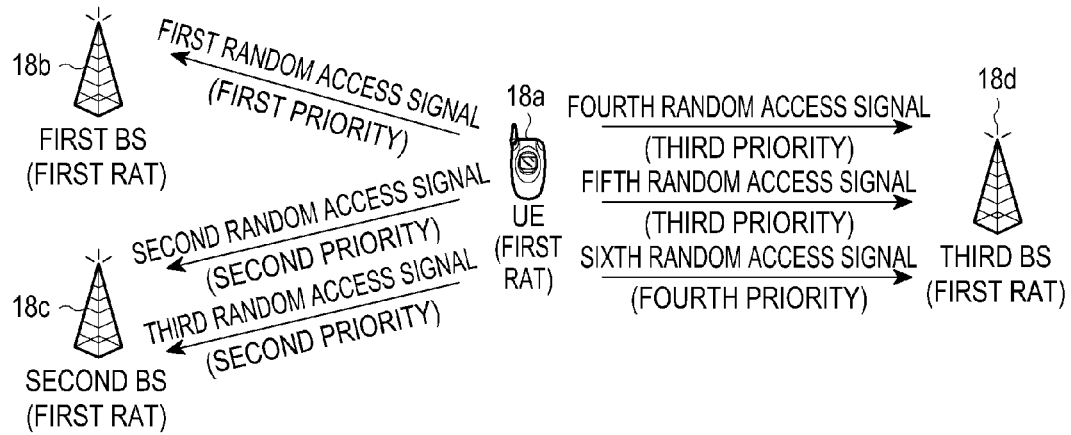
FIG. 18 is a view for explaining a random access method in which a UE transmits a plurality of random access signals to each of three target communication nodes with a same RAT in a wireless communication system according to an exemplary embodiment of the present invention.

FIGS. 16 to 18 show examples where a UE determines random access parameters and priorities for random access signals in such a manner as to transmit at least one random access signal to each of at least two target communication nodes in a wireless communication system according to an exemplary embodiment of the present invention.

FIG. 16 illustrates a random access method in which a UE transmits a plurality of random access signals to each of two target communication nodes with the same RAT in a wireless communication system according to an exemplary embodiment of the present invention.

Referring to FIG. 16, a UE 16a supporting a first RAT determines random access parameters and priorities for random access signals in such a manner as to transmit first, second, and third random access signals with the first priority to a first BS 16b of the first RAT and transmit fourth and fifth random access signals with the second priority to a second BS 16c of the first RAT. For a UE using one active RAT, a step of determining the first RAT as a target RAT for random access may be included or omitted in the random access method. In this way, a UE transmits at least one random access signal to each of at least two target communication nodes with the same RAT. With regard to this, a UE may have a plurality of modems for access to a plurality of communication nodes.

FIG. 17 illustrates a random access method in which a UE transmits a plurality of random access signals to each of two target communication nodes with the same RAT and transmits the one same random access signal to the two target communication nodes in a wireless communication system according to an exemplary embodiment of the present invention.

Referring to FIG. 17, a UE 17a supporting a first RAT determines random access parameters and priorities for random access signals in such a manner as to transmit first and second random access signals to a first BS 17b of the first RAT, transmit fourth and fifth random access signals to a second BS 17c of the first RAT, and simultaneously transmit a same third random access signal to the first BS 17b and the second BS 17c. In this way, a UE transmits at least one random access signal to each of at least two target communication nodes with the same RAT. With regard to this, a UE may have a plurality of modems for access to a plurality of communication nodes.

FIG. 18 illustrates a random access method in which a UE transmits a plurality of random access signals to each of three target communication nodes with the same RAT in a wireless communication system according to an exemplary embodiment of the present invention.

Referring to FIG. 18, a UE 18a supporting a first RAT determines random access parameters and priorities for random access signals in such a manner as to transmit a first random access signal with the first priority to a first BS 18b of the first RAT, transmit second and third random access signals with the second priority to a second BS 18c of the first RAT, and transmit fourth and fifth random access signals with the third priority and a sixth random access signal with the fourth priority to a third BS 18d of the first RAT. For a UE using one active RAT, a step of determining the first RAT as a target RAT for random access may be included or omitted in the random access method. In this way, a UE transmits at least one random access signal to each of three target communication nodes with the same RAT. With regard to this, a UE may have a plurality of modems for access to a plurality of communication nodes.

Figure 19:
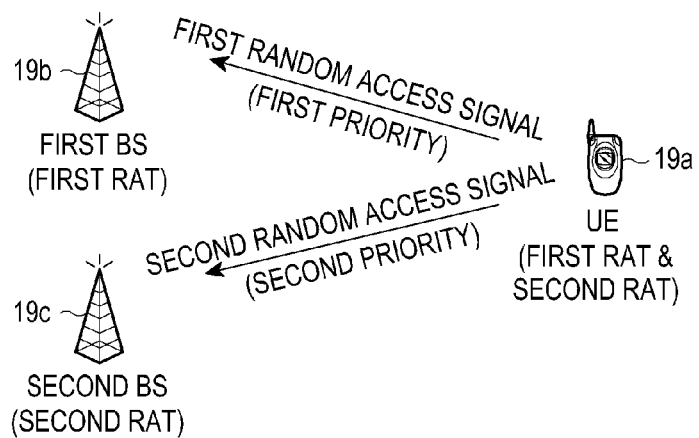
FIG. 19 is a view for explaining a random access method in which a UE transmits one random access signal to each of two target communication nodes with different RATs in a wireless communication system according to an exemplary embodiment of the present invention.
Figure 20:
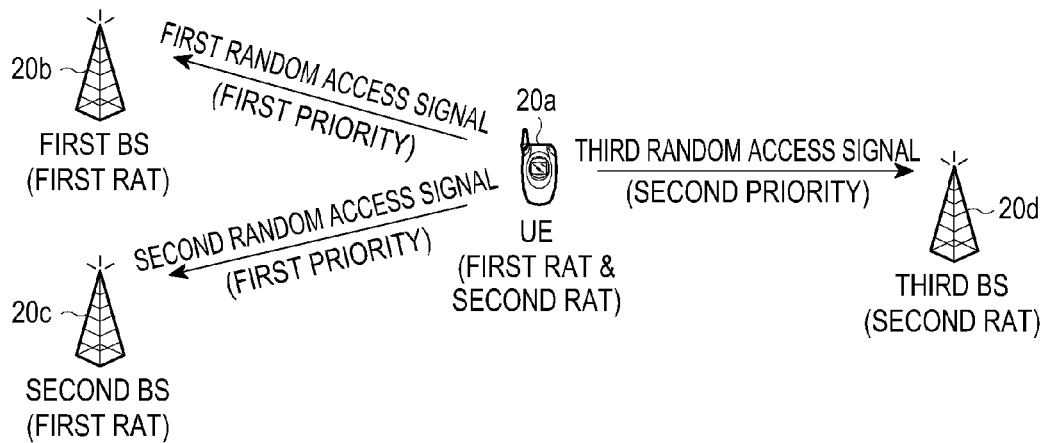
FIG. 20 is a view for explaining a random access method in which a UE transmits one random access signal to each of three target communication nodes, some of which are of a different RAT, in a wireless communication system according to an exemplary embodiment of the present invention.
Figure 21:
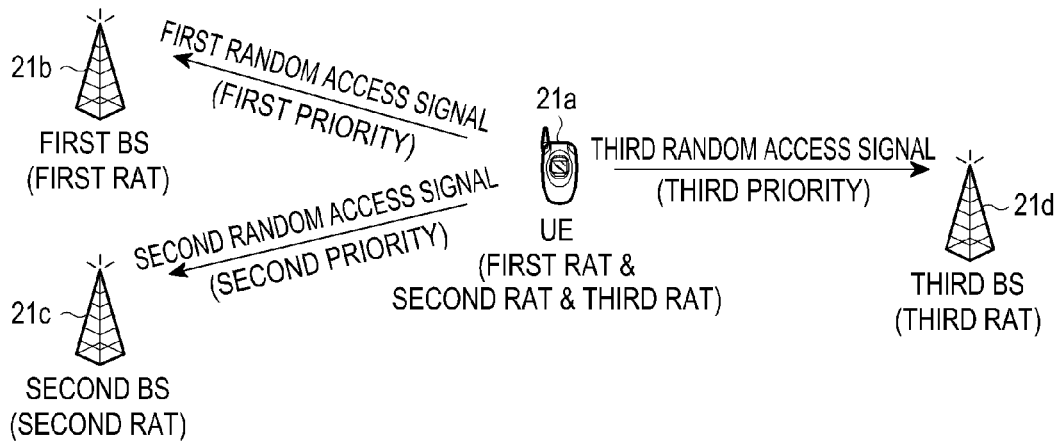
FIG. 21 is a view for explaining a random access method in which a UE transmits one random access signal to each of three target communication nodes with different RATs in a wireless communication system according to an exemplary embodiment of the present invention.

FIGS. 19 to 21 show examples where a UE determines random access parameters and priorities for random access signals in such a manner as to transmit one random access signal to each of target communication nodes with different RATs in a wireless communication system according to an exemplary embodiment of the present invention.

FIG. 19 illustrates a random access method in which a UE transmits one random access signal to each of two target communication nodes with different RATs in a wireless communication system according to an exemplary embodiment of the present invention.

Referring to FIG. 19, a UE 19a supporting first and second RATs determines random access parameters and priorities for random access signals in such a manner as to transmit a first random access signal with the first priority to a first BS 19b of the first RAT and transmit a second random access signal with the second priority to a second BS 19c of the second RAT. In this way, a UE transmits one random access signal to each of at least two target communication nodes with different RATs. With regard to this, a UE may have a plurality of RAT modems for access to a plurality of RATs.

FIG. 20 illustrates a random access method in which a UE transmits one random access signal to each of three target communication nodes, some of which are of a different RAT, in a wireless communication system according to an exemplary embodiment of the present invention.

Referring to FIG. 20, a UE 20a supporting first and second RATs determines random access parameters and priorities for random access signals in such a manner as to transmit a first random access signal with the first priority to a first BS 20b of the first RAT, transmit a second random access signal with the first priority to a second BS 20c of the first RAT, and transmit a third random access signal with the second priority to a third BS 20d of the second RAT. In this way, a UE transmits one random access signal to each of three target communication nodes, some of which are of a different RAT. With regard to this, a UE may have a plurality of RAT modems for access to a plurality of RATs.

FIG. 21 illustrates a random access method in which a UE transmits one random access signal to each of three target communication nodes with different RATs in a wireless communication system according to an exemplary embodiment of the present invention.

Referring to FIG. 21, a UE 21a supporting first, second, and third RATs determines random access parameters and priorities for random access signals in such a manner as to transmit a first random access signal with the first priority to a first BS 21b of the first RAT, transmit a second random access signal with the second priority to a second BS 21c of the second RAT, and transmit a third random access signal with the third priority to a third BS 21d of the third RAT. In this way, a UE transmits one random access signal to each of at least three target communication nodes with different RATs. With regard to this, a UE may have a plurality of RAT modems for access to a plurality of RATs.

FIGS. 22 to 25 show examples where a UE determines random access parameters and priorities for random access signals in such a manner as to transmit at least one random access signal to each of at least two target communication nodes with different RATs in a wireless communication system according to an exemplary embodiment of the present invention.

Figure 22:
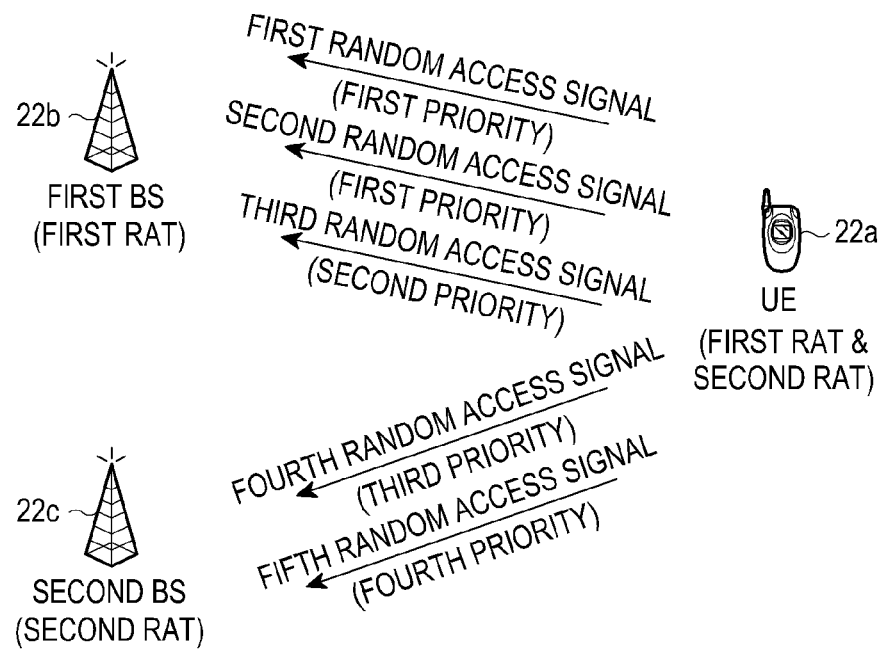
FIG. 22 is a view for explaining a random access method in which a UE transmits a plurality of random access signals to each of two target communication nodes with different RATs in a wireless communication system according to an exemplary embodiment of the present invention.

FIG. 22 illustrates a random access method in which a UE transmits a plurality of random access signals to each of two target communication nodes with different RATs in a wireless communication system according to an exemplary embodiment of the present invention.

Referring to FIG. 22, a UE 22a supporting first and second RATs determines random access parameters and priorities for random access signals in such a manner as to transmit first and second random access signals with the first priority and a third random access signal with the second priority to a first BS 22b of the first RAT and transmit a fourth random access signal with the third priority and fifth random access signal with the fourth priority to a second BS 22c of the second RAT. In this way, a UE transmits at least one random access signal to each of at least two target communication nodes with different RATs. With regard to this, a UE may have a plurality of RAT modems for access to a plurality of RATs.

Figure 23:
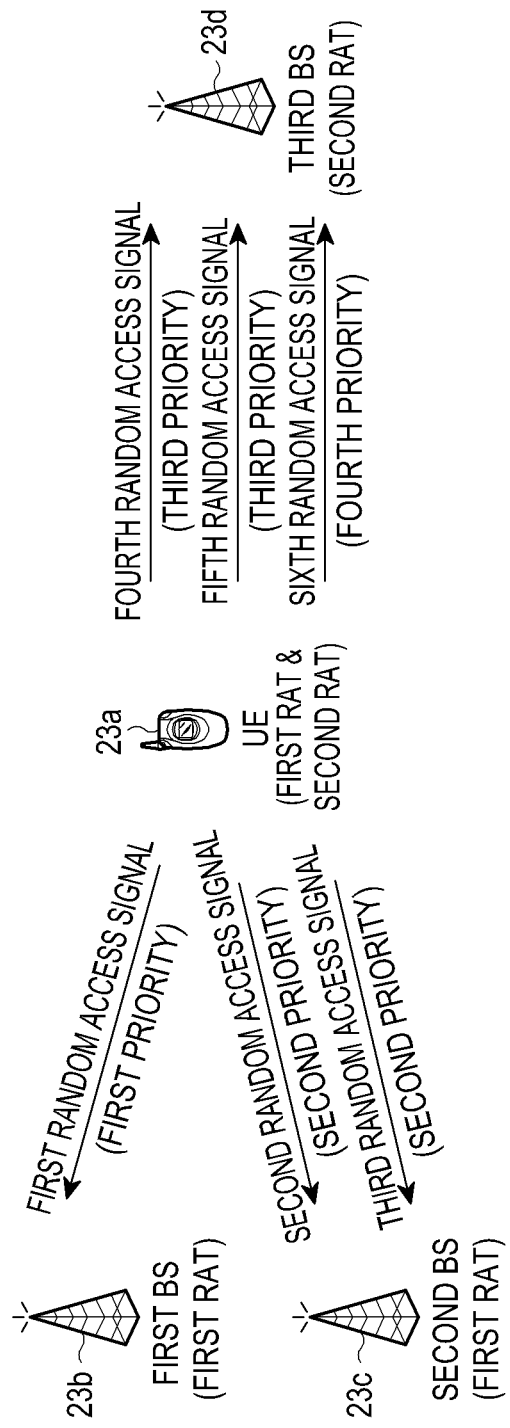
FIG. 23 is a view for explaining a random access method in which a UE transmits a plurality of random access signals to each of three target communication nodes, some of which are of a different RAT, in a wireless communication system according to an exemplary embodiment of the present invention.

FIG. 23 illustrates a random access method in which a UE transmits a plurality of random access signals to each of three target communication nodes, some of which are of a different RAT, in a wireless communication system according to an exemplary embodiment of the present invention.

Referring to FIG. 23, a UE 23a supporting first and second RATs determines random access parameters and priorities for random access signals in such a manner as to transmit a first random access signal with the first priority to a first BS 23b of the first RAT, transmit second and third random access signals with the second priority to a second BS 23c of the first RAT, and transmit fourth and fifth random access signals with the third priority and a sixth random access signal with the fourth priority to a third BS 23d of the second RAT. In this way, a UE transmits at least one random access signal to each of at least three target communication nodes, some of which are of a different RAT. With regard to this, a UE may have a plurality of RAT modems for access to a plurality of RATs.

Figure 24:
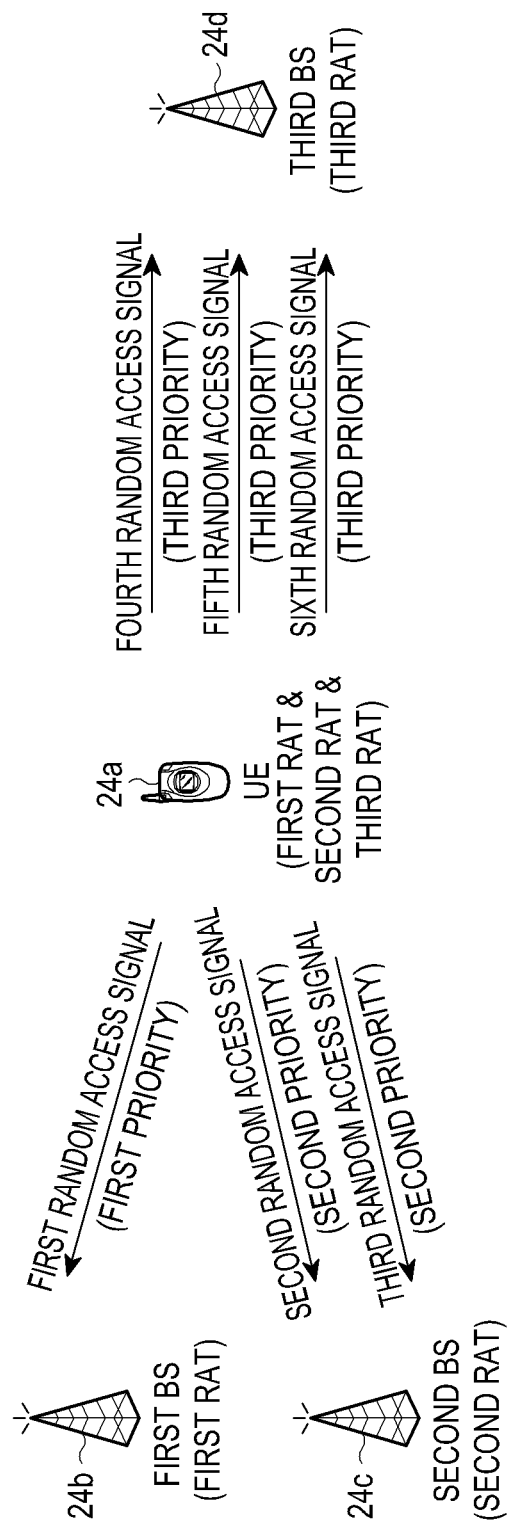
FIG. 24 is a view for explaining a random access method in which a UE transmits a plurality of random access signals to each of three target communication nodes with different RATs in a wireless communication system according to an exemplary embodiment of the present invention.

FIG. 24 illustrates a random access method in which a UE transmits a plurality of random access signals to each of three target communication nodes with different RATs in a wireless communication system according to an exemplary embodiment of the present invention.

Referring to FIG. 24, a UE 24a supporting first, second, and third RATs determines random access parameters and priorities for random access signals in such a manner as to transmit a first random access signal with the first priority to a first BS 24b of the first RAT, transmit second and third random access signals with the second priority to a second BS 24c of the second RAT, and transmit fourth, fifth, and sixth random access signals with the third priority to a third BS 24d of the third RAT. In this way, a UE transmits at least one random access signal to each of at least three target communication nodes with different RATs. With regard to this, a UE may have a plurality of RAT modems for access to a plurality of RATs.

Figure 25:
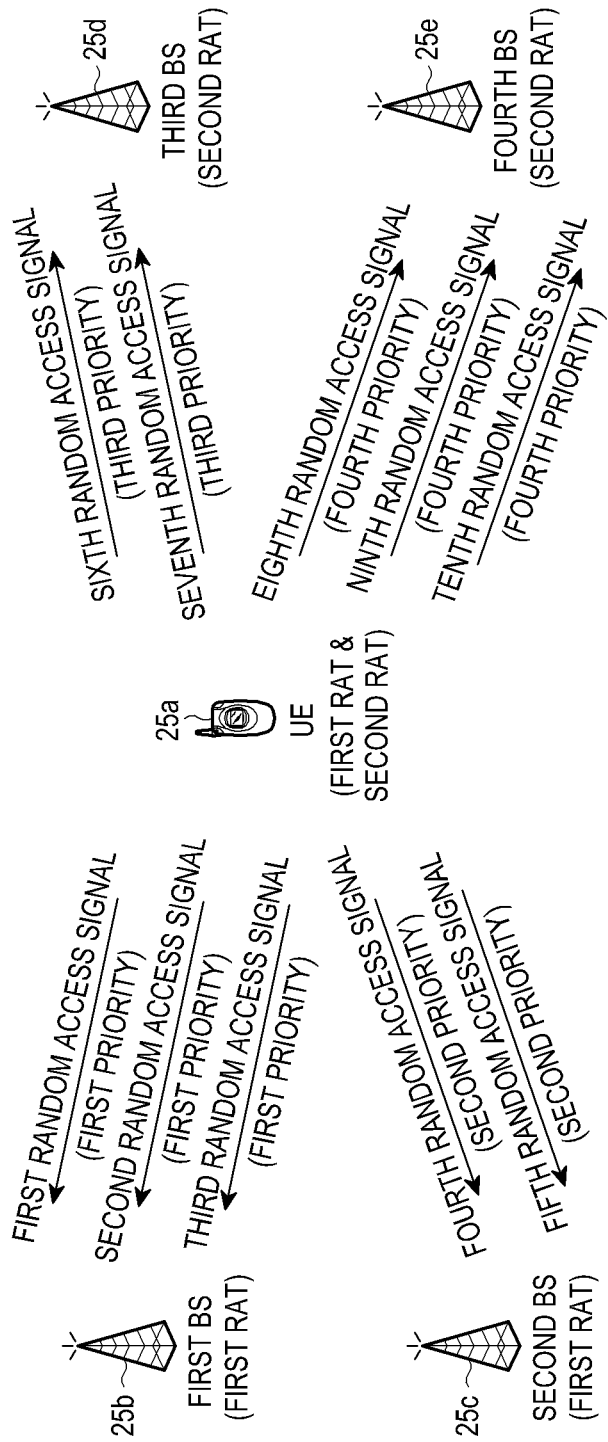
FIG. 25 is a view for explaining a random access method in which a UE transmits a plurality of random access signals to each of two target communication nodes of a first RAT and two target communication nodes of a second RAT in a wireless communication system according to an exemplary embodiment of the present invention.

FIG. 25 illustrates a random access method in which a UE transmits a plurality of random access signals to each of two target communication nodes of a first RAT and two target communication nodes of a second RAT in a wireless communication system according to an exemplary embodiment of the present invention.

Referring to FIG. 25, a UE 25a supporting first and second RATs determines random access parameters and priorities for random access signals in such a manner as to transmit first, second, and third random access signals with the first priority to a first BS 25b of the first RAT, transmit fourth and fifth random access signals with the second priority to a second BS 25c of the first RAT, transmit sixth and seventh random access signals with the third priority to a third BS 25d of the second RAT, and transmit eight, ninth, and tenth random access signals with the fourth priority to a fourth BS 25e of the second RAT. In this way, a UE transmits at least one random access signal to each of at least four target communication nodes with different RATs. With regard to this, a UE may have a plurality of RAT modems for access to a plurality of RATs.

Next, reference will be made in detail to step 400 of FIG. 1, in which the UE performs random access control by using the at least two random access response signals.

In a random access method according to exemplary embodiments of the present invention, a UE receives at least two random access response signals from at least one target communication node in response to at least one random access signal transmitted by the UE, and selects some or all of the at least two random access response signals to perform random access control by using the selected random access response signals. The random access response signals include no-response from the at least one target communication node. The no-response includes one or more of a collision with random access signals from at least another UE, the refusal of a target communication node for random access to accept a random access signal, loss of a random access signal or random access response signal due to poor channel conditions, and the like. The UE selects some or all of the at least two random access response signals (including the no-response) by taking into account of at least one of the considerations for the selection of the random access response signals. The considerations for the selection of the random access response signals include one or more of a RAT, an expected QoS, a signal strength, a transmission priority, whether or not random access response signals are from the same RAT, whether or not random access response signals are form the same communication node, and the like.

(1) Considerations for Selection of Random Access Response Signals

First of all, the RAT is a condition for a RAT that is employed by a target communication node having transmitted a corresponding random access response signal. A UE selects random access response signals in consideration of the expected cost for using a corresponding RAT, an expected available QoS, and the like.

As an example, when a UE selects random access response signals in consideration of the expected cost for using a corresponding RAT, it selects at least one of the random access response signals received from target communication nodes of various RATs in ascending order of the expected cost with the proviso that the selected random access response signals guarantee service requirements.

In the second place, the expected QoS is a QoS that can be expected to be provided by a target communication node having transmitted a corresponding random access response signal. A UE selects random access response signals based on an expected delay, expected through put, or an expected error rate in consideration of the expected QoS.

As an example, when a UE selects random access response signals based on the expected throughput in consideration of the expected QoS, it selects at least one of the random access response signals received from target communication nodes of various RATs in descending order of the expected throughput with the proviso that the selected random access response signals guarantee service requirements.

As another example, when a UE selects random access response signals based on the expected delay in consideration of the expected QoS, it selects at least one of the random access response signals received from target communication nodes of various RATs in ascending order of the expected delay with the proviso that the selected random access response signals guarantee service requirements.

As yet another example, when a UE selects random access response signals based on the expected error rate in consideration of the expected QoS, it selects at least one of the random access response signals received from target communication nodes of various RATs in ascending order of the expected error rate with the proviso that the selected random access response signals guarantee service requirements.

In the third place, the signal strength is the strength of a random access response signal received from a target communication node having transmitted the corresponding random access response signal. A UE selects random access response signals based on RSSI, SNR, or SINR in consideration of the signal strength.

As an example, when a UE selects random access response signals based on the SNR in consideration of the signal strength, it selects at least one of the random access response signals received from target communication nodes of various RATs in descending order of the SNR with the proviso that the selected random access response signals guarantee service requirements.

In the fourth place, the transmission priority is a priority that a UE provides to each of at least two random access signals when transmitting the at least two random access signals. A UE selects random access response signals in consideration of the transmission priority.

As an example, when a UE selects random access response signals in consideration of the transmission priority, it selects at least one of the random access response signals received from target communication nodes in descending order of the transmission priority with the proviso that the selected random access response signals guarantee service requirements.

In the fifth place, whether or not random access response signals are from the same RAT indicates how many random access response signals are received from target communication nodes with the same RAT. A UE selects random access response signals in consideration of the number of random access signals received from target communication nodes with the same RAT.

As an example, when a UE selects random access response signals in consideration of whether or not random access response signals are from the same RAT, it selects at least one of the random access response signals received from target communication nodes of various RATs by preferentially selecting random access response signals received from a target communication node group using the same RAT, the number of which is larger than that of any other target communication node group using the same RAT, with the proviso that the selected random access response signals guarantee service requirements.

As another example, when a UE selects random access response signals in consideration of whether or not random access response signals are from the same RAT, it selects at least one of the random access response signals received from target communication nodes of various RATs by preferentially selecting random access response signals received from a target communication node group using the same RAT, the number of which is less than that of any other target communication node group using the same RAT, with the proviso that the selected random access response signals guarantee service requirements.

As yet another example, when a UE selects random access response signals in consideration of whether or not random access response signals are from the same RAT, it selects at least one of the random access response signals received from target communication nodes of various RATs by selecting only one of the random access response signals received from each target communication node group using the same RAT with the proviso that the selected random access response signals guarantee service requirements.

In the sixth place, whether or not random access response signals are from the same target communication node indicates how many random access response signals are received from the same target communication node. A UE selects random access response signals in consideration of the number of random access signals received from the same target communication node.

As an example, when a UE selects random access response signals in consideration of whether or not random access response signals are from the same target communication node, it selects at least one of the random access response signals received from target communication nodes by preferentially selecting random access response signals received from a target communication node, the number of which is larger than that of any other target communication node, with the proviso that the selected random access response signals guarantee service requirements.

As another example, when a UE selects random access response signals in consideration of whether or not random access response signals are from the same target communication node, it selects at least one of the random access response signals received from target communication nodes by preferentially selecting random access response signals received from a target communication node, the number of which is less than that of any other target communication node, with the proviso that the selected random access response signals guarantee service requirements.

As yet another example, when a UE selects random access response signals in consideration of whether or not random access response signals are from the same target communication node, it selects at least one of random access response signals received from target communication nodes by selecting only one of the random access response signals received from each target communication node with the proviso that the selected random access response signals guarantee service requirements.

(2) Service Requirements

The service requirements are a parameter used for smoothly providing a user with a service requested by the user, and include at least one of a traffic class, a Quality of Experience (QoE), and a Quality of Service (QoS).

The traffic class includes one or more of a huge data file, a voice call, a video call, a video streaming, a web browsing, a game, and the like, and the QoE includes one or more of a Mean Opinion Score (MOS), a call outage rate, an R-value, an initial buffering time, the jerkiness, a page response time, a data transmission rate, a download time, and the like.

For the traffic class, the MOS is a value indicative of the service quality considering perceptual characteristics of people, the call outage rate is the probability of occurrence of voice call outage, the R-value is a quality indicator that represents a quality of experience in a measurement interval by using network environment information, the initial buffering time is the period of time taken until a user is provided with an initial service by buffering of certain data, starting from the user's request for a video streaming service, the jerkiness is a perceptual measure of a frozen picture or motion that does not look smooth, the page response time is the period of time taken until a user is provide with a webpage, starting from the user's request for the corresponding webpage, and the download time is the total time required to download a requested file.

The QoS includes one or more of throughput, a transmission delay, an error rate, packet loss, jitter, and the like.

For the QoS, the throughput is the amount of packets transmitted per unit time, the transmission delay is the time taken to receive a next packet after receiving a corresponding packet, the error rate is the probability of an error occurring in signal transmission, including a Bit Error Rate (BER), a BLock Error Rate (BLER), a Frame Error Rate (FER), and a Packet Error Rate (PER), the packet loss is the probability of packet loss occurring in packet transmission, and the jitter is a variance of packet inter-arrival time, which is indicative of the degree of a change in the arrival time of packets.

(3) Strategy for Selection of Target Communication Node for Connection Establishment Considering at least one consideration for the selection of random access response signals, a UE selects at least one target communication node for connection establishment, which the UE is to access, from communication nodes having transmitted at least two random access response signals, and selects at least one random access response signal received from the selected target communication for connection establishment.

As a first strategy, a UE may first select at least one possible communication node for connection establishment by using at least two received random access response signals (including no-response), and then select at least one target communication node for connection establishment and at least one random access signal received from the at least one target communication node for connection establishment from the at least one possible communication node for connection establishment by taking account of at least one consideration for the selection of random access response signals.

A strategy for selection of possible communication nodes for connection establishment is discussed below.

A UE selects all communication nodes, which have transmitted at least one random access response signal resulting in successful random access among at least two random access response signals (including no-response), as possible communication nodes for connection establishment, and selects at least one random access response signal received from the selected possible communication nodes for connection establishment.

A UE selects all communication nodes, which have transmitted random access response signals resulting in successful random access and satisfying corresponding requirement criteria respectively when considering at least one consideration of the selection of random access response signals among at least two random access response signals (including no-response), as possible communication nodes for connection establishment, and selects at least one random access response signal received from the selected possible communication nodes for connection establishment.

As an example, when a UE considers minimum required throughput as a QoS requirement criterion, it selects all communication nodes, which have transmitted random access response signals with expected throughput satisfying the minimum required throughput among random access response signals received from target communication nodes, as possible communication nodes for connection establishment, and selects at least one random access response signal received from the selected possible communication nodes for connection establishment.

A strategy for selection of target communication nodes for connection establishment and random access response signals is discussed below.

When one communication node is selected in the process of selecting the possible communication nodes for connection establishment, a UE selects the corresponding communication node as a target communication node for connection establishment, and selects at least one random access response signal received from the selected target communication node for connection establishment by taking account of at least one consideration for the selection of random access response signals.

A UE selects at least one target communication node for connection establishment, which has transmitted random access response signals satisfying corresponding requirement criteria respectively when considering at least one consideration of the selection of random access response signals, from at least two possible communication nodes for connection establishment, and selects at least one random access response signal received from the selected at least one target communication node for connection establishment.

When a UE considers the RAT consideration as the consideration for the selection of random access response signals, it selects at least one target communication node for connection establishment, which is of a first RAT, from at least two possible communication nodes for connection establishment, and selects at least one random access response signal received from the selected at least one target communication node for connection establishment.

When a UE considers the transmission delay as the consideration for the selection of random access response signals, it selects at least one target communication node for connection establishment, the expected transmission delay of which satisfies the required criterion (for example, 30 ms), from at least two possible communication nodes for connection establishment, and selects at least one random access response signal received from the selected at least one target communication node for connection establishment.

A UE selects at least one target communication node for connection establishment, which has transmitted random access response signals guaranteeing user requirements respectively in descending or ascending order of corresponding considerations when considering at least one consideration of the selection of random access response signals, from at least two possible communication nodes for connection establishment, and selects at least one random access response signal received from the selected at least one target communication node for connection establishment.

A UE selects at least one target communication node for connection establishment, which guarantees service requirements in ascending order of the expected cost, from at least two possible communication nodes for connection establishment, and selects at least one random access response signal received from the selected at least one target communication node for connection establishment.

A UE selects at least one target communication node for connection establishment, which guarantees service requirements in descending order of the expected throughput, from at least two possible communication nodes for connection establishment, and selects at least one random access response signal received from the selected at least one target communication node for connection establishment.

In the following, a strategy for selecting possible communication nodes for connection establishment and then selecting target communication nodes for connection establishment and random access response signals will be described.

As an example, when at least two communication nodes with different RATs are target communication nodes for random access, a UE first selects a set of possible communication nodes for connection establishment from communication nodes of the one same RAT by using random access response signals (including no-response) received from the communication nodes of the corresponding RAT and in consideration of the signal strength, expected QoS, and the like, and repeats this process for all the RATs. In this way, the UE selects possible communication nodes for connection establishment by selecting a set of possible communication nodes for connection establishment on a RAT-by-RAT basis. Next, the UE selects at least one target communication node for connection establishment by using random access response signals received from the selected possible communication nodes for connection establishment and in consideration of service requirements, etc., and selects at least one of the random access response signals (including no-response) received from the selected target communication node for connection establishment.

As a second strategy, a UE may select at least one target communication node for connection establishment and at least one random access response signal received from the selected at least one target communication node for connection establishment by using received at least two random access response signals (including no-response).

A UE selects at least one target communication node for connection establishment, which has transmitted random access response signals satisfying corresponding requirement criteria respectively when considering at least one consideration of the selection of random access response signals, from communication nodes that have transmitted at least one random access response signal resulting in successful random access, and selects at least one random access response signal received from the selected at least one target communication node for connection establishment.

A UE selects at least one target communication node for connection establishment, which has transmitted random access response signals guaranteeing user requirements respectively in descending or ascending order of corresponding considerations when considering at least one consideration of the selection of random access response signals, from communication nodes that have transmitted random access response signals resulting in successful random access, and selects at least one random access response signal received from the selected at least one target communication node for connection establishment.

As an example, using at least two random access response signals (including no-response) received from one communication node, a UE selects a target communication node for connection establishment and selects at least one of the at least two random access response signals (including no-response) received from the selected target communication node for connection establishment.

As another example, using at least two random access response signals (including no-response) received from a plurality of synchronized communication nodes with the same RAT, a UE selects at least one target communication node for connection establishment and selects at least one of the random access response signals (including no-response) received from the selected at least one target communication node for connection establishment.

As yet another example, a UE receives all random access response signals (including no-response) received from a plurality of non-synchronized communication nodes with the same RAT respectively, and then selects at least one target communication node for connection establishment and selects at least one of the random access response signals (including no-response) received from the selected at least one target communication node for connection establishment by using all the received random access response signals (including no-response).

As still yet another example, a UE receives all random access response signals (including no-response) received from a plurality of target communication nodes of various RATs respectively, and then selects at least one target communication node for connection establishment and selects at least one of the random access response signals (including no-response) received from the selected at least one target communication node for connection establishment by using all the received random access response signals (including no-response). With regard to this, since the UE may receive random access response signals at different times according to RATs or target communication nodes, the UE does not select at least one target communication node for connection establishment and at least one random access response signal received from the selected at least one target communication node for connection establishment until it receives all random access response signals in response to at least two random access signals that the UE has transmitted to at least two target communication nodes for random access.

(4) Random Access Control Using Random Access Response Signals

A technique for determination on random access completion is discussed below.

This is a process of selecting at least one target communication node for connection establishment, which has transmitted random access response signals satisfying service requirements among random access response signals resulting in successful random access, except random access response signals corresponding to no-response (a collision with random access signals from at least another UE, the refusal of a target communication node for random access to accept a random access signal, loss of a random access signal or random access response signal due to poor channel conditions, etc.), and selecting at least one random access response signal received from the selected at least one target communication node for connection establishment.

A technique for connection establishment is described below.

This is a process of performing a connection establishment procedure for the selected target communication node for connection establishment, based on the result of the determination on random access completion.

A technique for additional random access transmission is described below.

This is a process of retransmitting at least one random access signal to at least one target communication node for random access where a collision occurs or transmitting at least one random access signal to at least one target communication node for random access, based on the result of the determination on random access completion, in order to satisfy service requirements. With regard to this, at least one of a set of RATs, a set of target communication nodes, the number of random access signals, priorities, and random access parameters are determined in consideration of random access conditions according to the corresponding random access control step.

Figure 26:
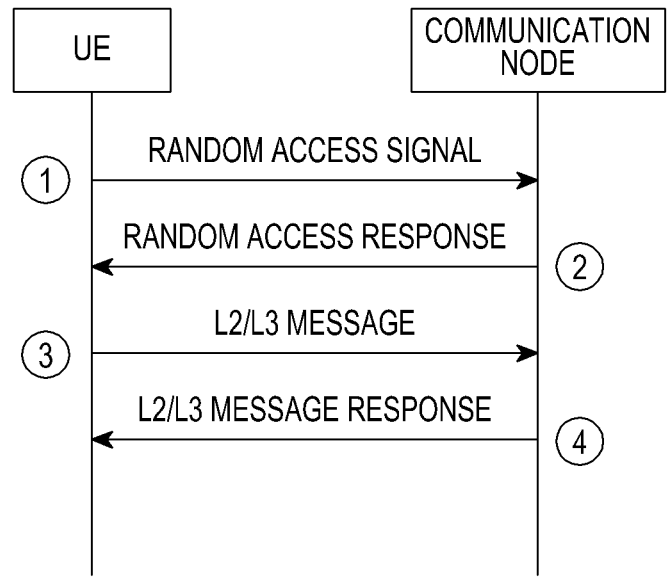
FIG. 26 is a view illustrating a random access procedure in a wireless communication system according to an exemplary embodiment of the present invention.

FIG. 26 illustrates a random access procedure in a wireless communication system according to an exemplary embodiment of the present invention.

Referring to FIG. 26, if at least one communication node receives at least one random access signal 1 transmitted from a UE without any collision, then the corresponding communication node transmits a random access response message 2 including uplink resource allocation information to the UE. Upon receiving the random access response message 2, the UE transmits an L2/L3 message 3 by using uplink resources allocated by the corresponding communication node. Thereafter, the communication node transmits L2/L3 response message 4.

As an example of transmitting at least two random access signals with different information, the UE transmits at least two random access signals with different information, which are configured to include information on the required amount of resources for transmission of an L2/L3 message 3, to at least one communication node. When the at least one communication node obtains the required resource amount information of the UE by receiving some or all of the at least two random access signals, the corresponding communication node can allocate a required amount of resources for transmission of the L2/L3 message to the UE through random access responses.

As another example, when the UE ensures additional resources for transmission of an L2/L3 message by transmitting multiple random access signals without any collision, it can transmit an additional message, such as a security message, together with a basic connection message through the L2/L3 message.

FIGS. 27A to 27J illustrate various structures of a UE performing the operation of FIG. 1 in a wireless communication system according to exemplary embodiments of the present invention.

The UE includes a random access controller for controlling random access by using at least two random access signals. In order to transmit at least two random access signals with their own priorities to at least one communication node, the random access controller of the UE determines at least one of the number of the at least two random access signals, priorities for the at least two random access signals, and random access parameters.

Hereinafter, control schemes for random access control in various UE structures of FIGS. 27A to 27J will be described.

Figure 27A:
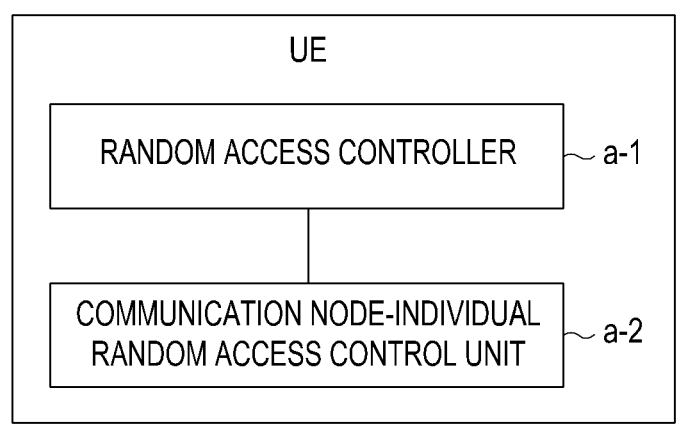
FIGS. 27A to 27J are views illustrating different UE structures in a wireless communication system according to exemplary embodiments of the present invention.

FIG. 27A illustrates the structure of a UE structure according to a first exemplary embodiment of the present invention.

Referring to FIG. 27A, the UE includes a random access controller a-1 and one communication node-individual random access control unit a-2.

The random access controller a-1 controls random access for at least one communication node of one RAT by controlling the one communication node-individual random access control unit a-2. Of course, the RAT may vary according to functions.

Figure 27B:
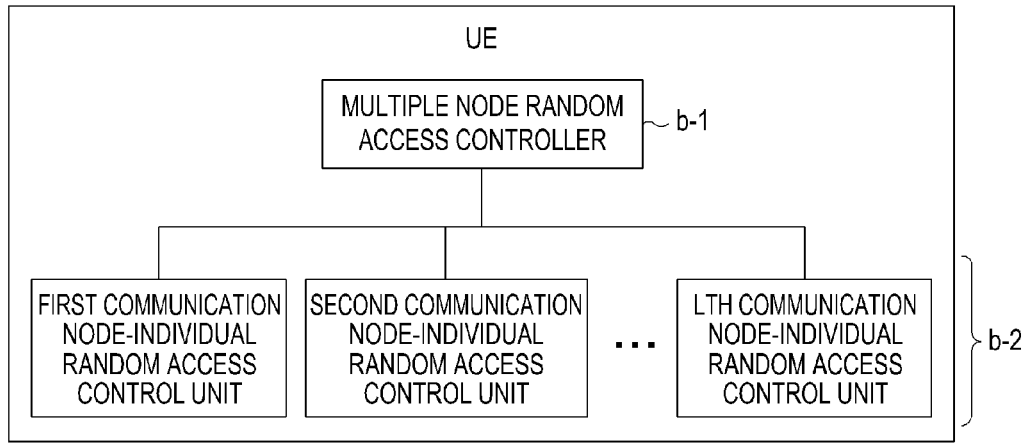

FIG. 27B illustrates the structure of a UE structure according to a second exemplary embodiment of the present invention.

Referring to FIG. 27B, the UE includes a multiple node random access controller b-1 and L communication node-individual random access control units b-2.

The multiple node random access controller b-1 controls random access for a plurality of communication nodes by performing combining control for the L communication node-individual random access control units b-2. With regard to this, communication node-individual random access control is possible regardless of the RAT of each communication node.

The L communication node-individual random access control units b-2 perform random access control functions for L communication nodes respectively, under the control of the multiple node random access controller b-1.

Figure 27C:
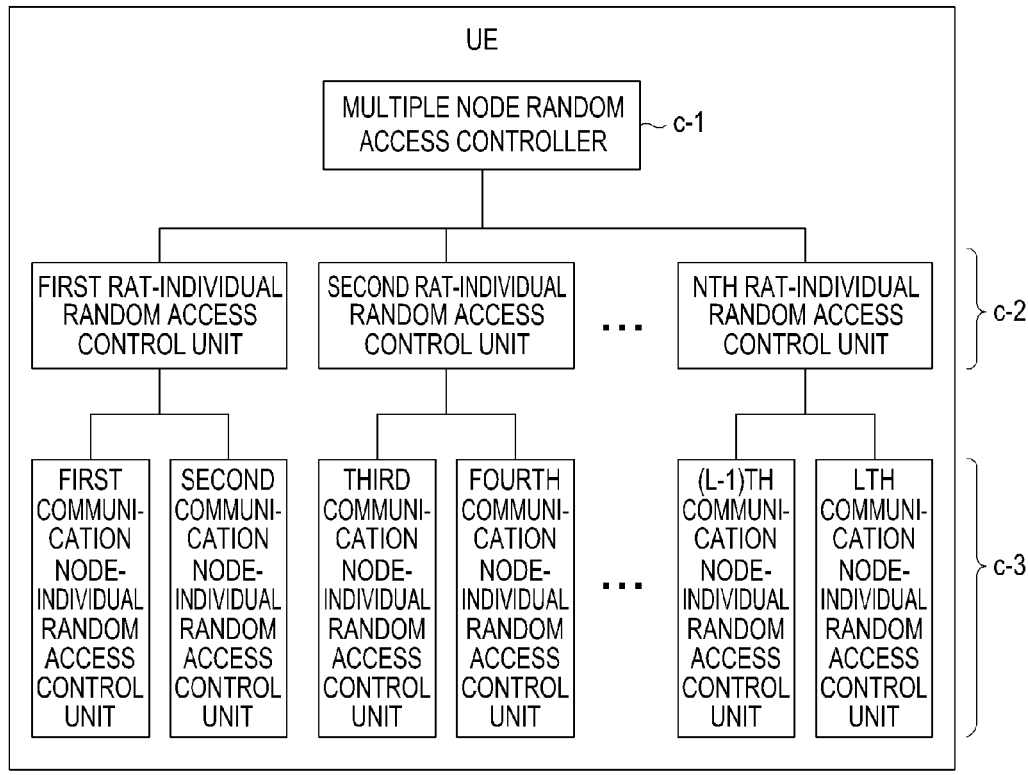

FIG. 27C illustrates the structure of a UE structure according to a third exemplary embodiment of the present invention.

Referring to FIG. 27C, the UE includes a multiple node random access controller c-1, N RAT-individual random access control units c-2, and L communication node-individual random access control units c-3.

The N RAT-individual random access control units c-3 are located between the multiple node random access controller c-1 and the L communication node-individual random access control units c-3, and perform random access for respective RATs.

The multiple node random access controller c-1 controls random access for communication nodes of various RATs by controlling the N RAT-individual random access control units c-2 in a combined manner.

The N RAT-individual random access control units c-2 perform random access control functions for N RATs respectively, under the control of the multiple node random access controller c-1.

Each of the N RAT-individual random access control units c-2 controls random access for a plurality of communication nodes of each RAT by performing combining control for at least one communication node-individual random access control unit, included in the corresponding RAT-individual random access control unit.

The L communication node-individual random access control units c-3 perform random access control functions for L communication nodes respectively, under the control of the corresponding RAT-individual random access control unit.

Figure 27D:
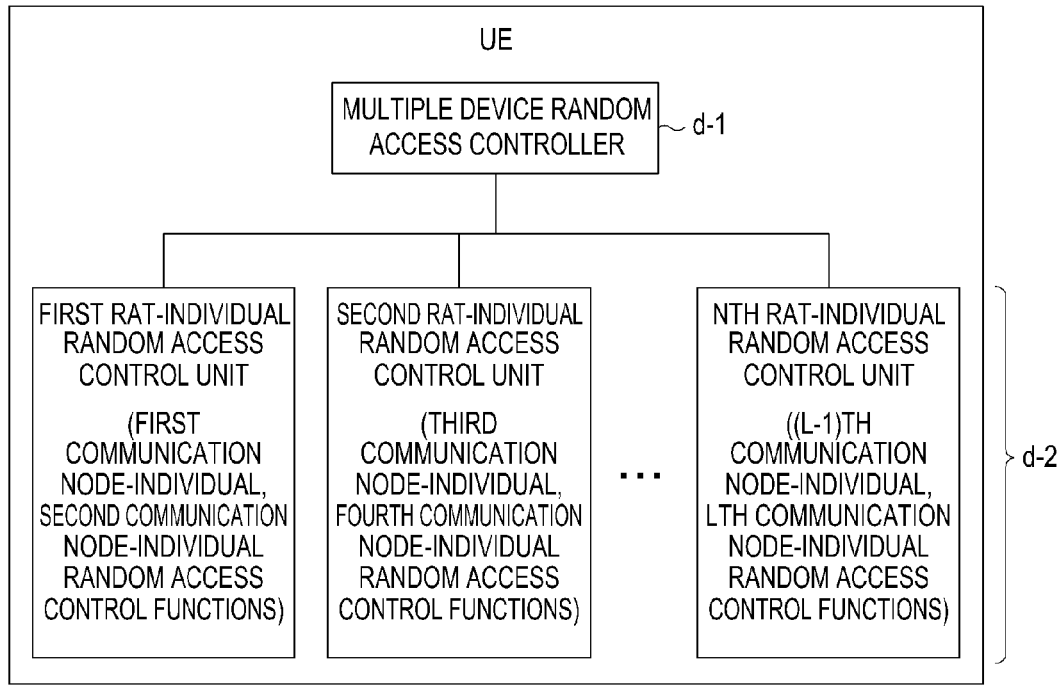

FIG. 27D illustrates the structure of a UE structure according to a fourth exemplary embodiment of the present invention.

Referring to FIG. 27D, the UE includes a multiple node random access controller d-1 and N RAT-individual random access control units d-2.

The multiple node random access controller d-1 controls random access for communication nodes of various RATs by controlling the N RAT-individual random access control units d-2 in a combined manner.

The N RAT-individual random access control units d-2 perform random access control functions for N RATs respectively, under the control of the multiple node random access controller d-1.

Further, each of the N RAT-individual random access control units d-2 includes random access functions for a plurality of communication nodes of the corresponding RAT. Therefore, each of the N RAT-individual random access control units d-2 controls random access for a plurality of communication nodes of each RAT by jointly performing the random access functions for a plurality of communication nodes of the corresponding RAT.

Figure 27E:
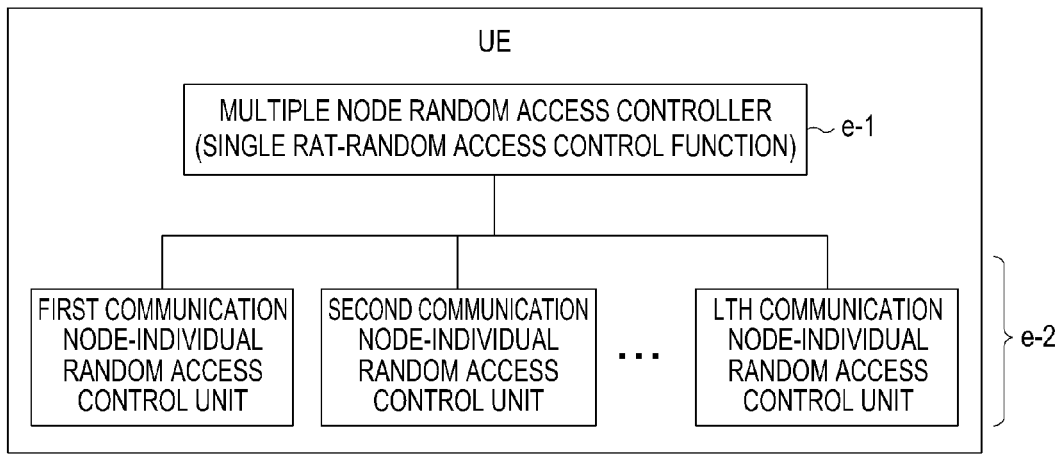

FIG. 27E illustrates the structure of a UE structure according to a fifth exemplary embodiment of the present invention.

Referring to FIG. 27E, the UE includes a multiple node random access controller e-1 and L communication node-individual random access control units e-2.

The multiple node random access controller e-1 controls random access for a plurality of communication nodes by controlling the L communication node-individual random access control units e-2 in a combined manner.

Further, the multiple node random access controller e-1 includes a single RAT-random access control function for the corresponding RAT. Therefore, the multiple node random access controller e-1 controls random access for a plurality of communication nodes of the corresponding RAT by performing the random access function for the corresponding RAT.

The L communication node-individual random access control units e-2 perform random access control functions for L communication nodes respectively, under the control of the multiple node random access controller e-1.

Figure 27F:
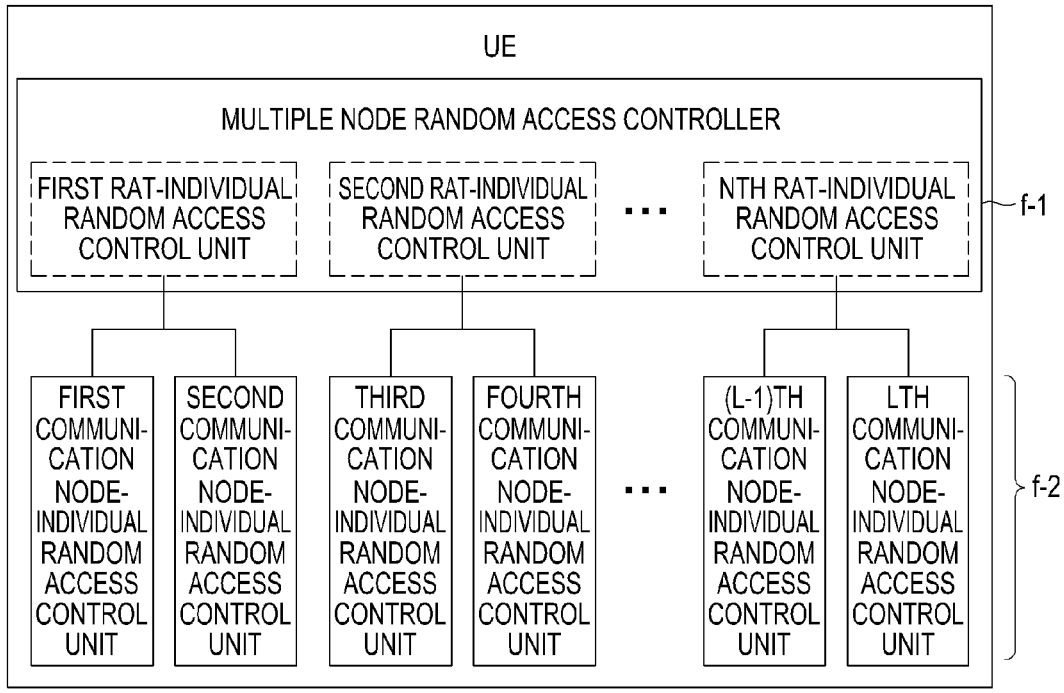

FIG. 27F illustrates the structure of a UE structure according to a sixth exemplary embodiment of the present invention.

Referring to FIG. 27F, the UE includes a multiple node random access controller f-1 and L communication node-individual random access control units f-2.

The multiple node random access controller f-1 includes N RAT-individual random access control functions. Therefore, the multiple node random access controller f-1 controls random access for a plurality of RATs by jointly performing the N RAT-individual random access control functions.

Each of the N RAT-individual controls random access functions included in the multiple node random access controller f-1 a random access control function for at least one communication node of each RAT.

Therefore, the multiple node random access controller f-1 controls random access for at least one communication node of each RAT by performing combining control for individual random access control units for communication nodes of the corresponding RAT, based on the N RAT-individual random access control functions included therein.

The L communication node-individual random access control units f-2 perform random access control functions for a plurality of communication nodes of each RAT respectively, under the control of the corresponding RAT-individual random access control function included in the multiple node random access controller f-1.

Figure 27G:
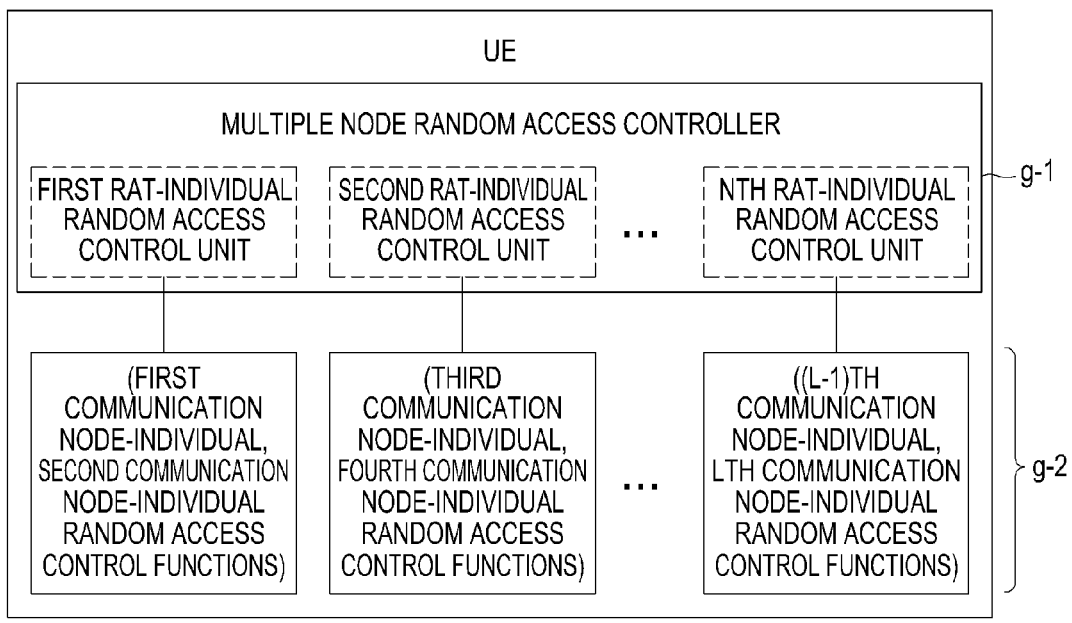

FIG. 27G illustrates the structure of a UE structure according to a seventh exemplary embodiment of the present invention.

Referring to FIG. 27G, the UE includes a multiple node random access controller g-1 and L communication node-individual random access control units g-2.

The multiple node random access controller g-1 includes N RAT-individual random access control functions. Therefore, the multiple node random access controller g-1 controls random access for a plurality of RATs by jointly performing the N RAT-individual random access control functions.

The multiple node random access controller g-1 controls random access for a plurality of communication node of each RAT by performing individual random access control functions for communication nodes of the corresponding RAT in a combined manner, based on the N RAT-individual random access control functions included therein.

The L communication node-individual random access control units g-2 perform random access control functions for a plurality of communication nodes of each RAT respectively, under the control of the corresponding RAT-individual random access control function included in the multiple node random access controller g-1.

Figure 27H:
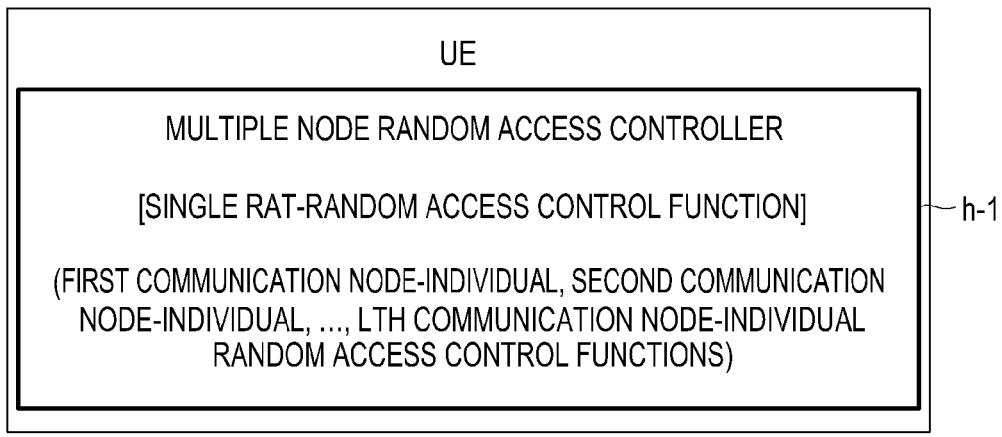

FIG. 27H illustrates the structure of a UE structure according to an eighth exemplary embodiment of the present invention.

Referring to FIG. 27H, the UE includes only a multiple node random access controller h-1, and the multiple node random access controller h-1 includes at least one of a RAT-individual random access control function for the corresponding RAT and L communication node-individual random access control functions for respective communication nodes of the corresponding RAT.

The multiple node random access controller h-1 controls random access by jointly performing the RAT-individual random access control function and the L communication node-individual random access functions for communication nodes of the corresponding RAT.

Since the multiple node random access controller h-1 jointly performs the RAT-individual random access control function and the communication node-individual random access functions, there is no need to separate the RAT-individual random access control function and the communication node-individual random access functions.

Figure 27I:
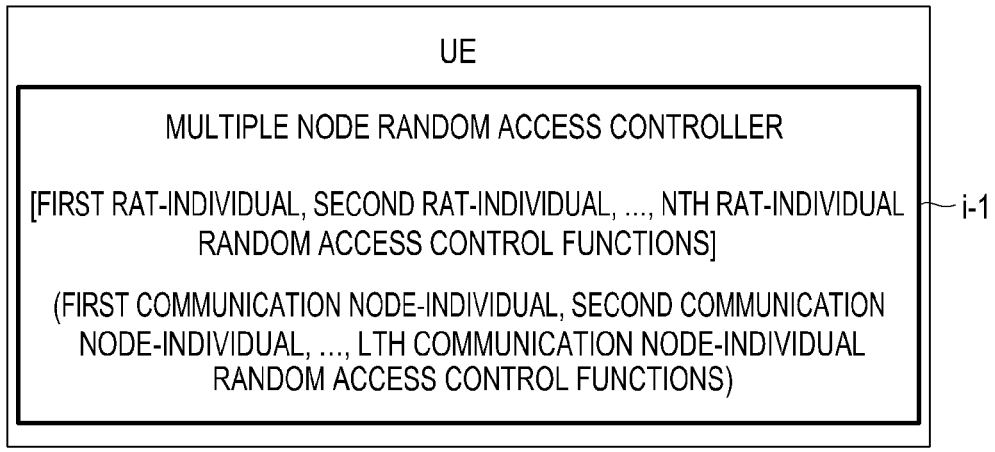

FIG. 27I illustrates the structure of a UE structure according to a ninth exemplary embodiment of the present invention.

Referring to FIG. 27I, the UE includes only a multiple node random access controller i-1, and the multiple node random access controller i-1 includes N RAT-individual random access control functions and L communication node-individual random access control functions for respective communication nodes of the corresponding RATs.

The multiple node random access controller i-1 controls random access by jointly performing the N RAT-individual random access control functions and the L communication node-individual random access functions.

Since the multiple node random access controller i-1 jointly performs the RAT-individual random access control functions and the communication node-individual random access functions, there is no need to separate the RAT-individual random access control functions and the communication node-individual random access functions.

Figure 27J:
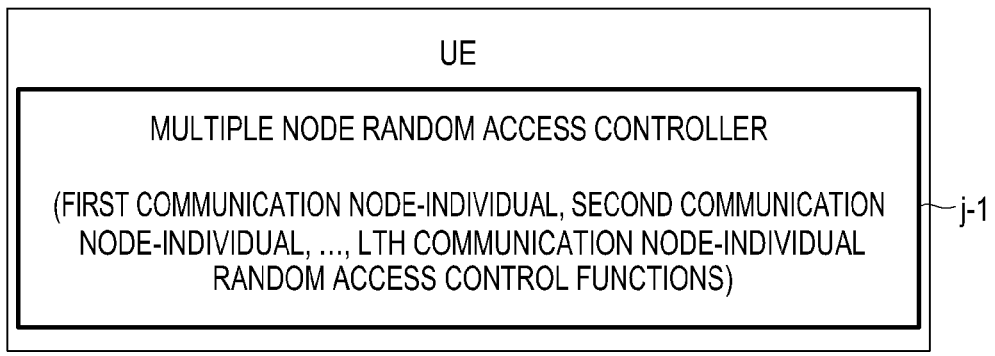

FIG. 27J illustrates the structure of a UE structure according to a tenth exemplary embodiment of the present invention.

Referring to FIG. 27J, the UE includes only a multiple node random access controller j-1, and the multiple node random access controller j-1 includes L communication node-individual random access control functions for respective communication nodes of the corresponding RAT.

The multiple node random access controller j-1 controls random access for a plurality of communication nodes by jointly performing the L communication node-individual random access functions.

Since the multiple node random access controller j-1 jointly performs the RAT-individual random access control functions and the communication node-individual random access functions, there is no need to separate the RAT-individual random access control functions and the communication node-individual random access functions. With regard to this, communication node-individual random access control is possible regardless of the RAT of each communication node.

When the random access method according to exemplary embodiments of the present invention is applied to a Time Division Multiple Access (TDMA) scheme (including a Carrier Sense Multiple Access (CSMA) scheme), a random access channel constituted by a time resource may be used.

Further, when the random access method according to exemplary embodiments of the present invention is applied to a Frequency Division Multiple Access (FDMA) scheme (including an Orthogonal FDMA (OFDMA) scheme), a random access channel constituted by a frequency resource may be used.

Further, when the random access method according to exemplary embodiments of the present invention is applied to a CDMA scheme (including a CSMA scheme), a random access channels constituted by a code resource may be used. Of course, a random access channel constituted by a combination of two resources may also be used.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method of performing random access by a User Equipment (UE) in a wireless communication system, the method comprising:
   generating at least two random access signals having their own transmission priorities; and
   transmitting, to at least one target communication node, the at least two random access signals based on their own transmission priorities for completing a first-trial random access transmission,
   wherein the generating the at least two random access signals having their own transmission priorities comprises:
   setting a transmission priority for each of the at least two random access signals based on random access conditions; and
   determining at least one random access parameter in each of the at least two random access signals, according to the set transmission priority,
   wherein the random access parameter includes at least one of a radio access technology (RAT) for each signal, a target communication node for each signal, a channel for each signal, a channel group for each signal, a power for each signal, a transmission order for each signal, a modulation parameter for each signal, a coding parameter for each signal, a length for each signal, a bandwidth for each signal, a processing gain for each signal, and information included in each signal,
   wherein the channel for each signal includes at least one of frequency channel, time channel, code channel, and antenna,
   wherein the random access condition includes at least one of a radio access technology (RAT) preference, a service charge, a neighbor list ranking, a channel condition, a service condition, an access condition, a type of a target communication node for random access, a bandwidth for use in random access, a distance between a user equipment (UE) and a target communication node for random access, the loading factor of a target communication node for random access, information on collided channels, and a collision probability,
   wherein the channel condition includes at least one of a quality factor related to channel characteristics and a quality factor related to space characteristics, and
   wherein the transmission priority of at least one random access signal of the at least two random access signals is different from the transmission priority of the rest of the at least two random access signals.

2. The method as claimed in claim 1, wherein the transmission priority is set in the at least two random access signals in response to a request of at least one target communication node for random access.

3. The method as claimed in claim 1, wherein the at least two random access signals are transmitted to at least two target communication nodes.

4. The method as claimed in claim 3, wherein the transmitting of the at least two random access signals to the at least two target communication nodes, comprises:
transmitting at least one random access signal to each of at least one of the at least two target communication nodes.

5. The method as claimed in claim 3, wherein the transmitting of the at least two random access signals to the at least two communication nodes, comprises:
generating the at least two random access signals by performing one of joint random access control and combining random access control for the at least two target communication nodes, wherein the joint random access control comprises jointly performing random access control for a plurality of communication nodes, and wherein the combining random access control comprises performing random access control by combining individual random access control functions for a plurality of target communication nodes.

6. The method as claimed in claim 1, wherein the channel characteristic-quality factor includes at least one of a Received Signal Strength Indicator (RSSI), a Signal-to-Noise Ratio (SNR), a Signal-to-Interference plus Noise Ratio (SINR), an error rate, a channel capacity, an available transmission rate, a variance of available transmission rates, an outage rate, and the like that are determined according to channel characteristics, such as fading, path fading, shadowing, delay spread, multipath, intra-cell interference, adjacent-cell interference, Doppler effect, antenna gain, and channel allocation.

7. The method as claimed in claim 1, wherein the collision probability is defined as a ratio of the number of collided channels to the total number of random access channels, or a ratio of the number of collided channels to the number of used random access channels.

8. The method as claimed in claim 1, the space characteristic-quality factor is a quality factor for additionally considering space characteristics for the channel characteristic-quality factor when signals are transmitted to multiple user groups by using multiple antennas,
wherein the space characteristic-quality factor includes at least one of a correlation between user channels, a correlation between antennas, the rank of a channel matrix, and channel quality parameters according to streams.

9. The method as claimed in claim 1, wherein the transmission priorities are determined based on at least one of Radio Access Technology (RAT) preference, a service charge, a neighbor list ranking, a channel condition, a bandwidth, a transmission rate, an error rate, a type of a target RAT for random access, a type of a target communication node for random access, a bandwidth for use in random access, a distance between the UE and the target communication node for random access, a loading factor of the target communication node for random access, information on collided channels, and a collision probability,
wherein the channel condition includes at least one of a channel characteristic-quality factor and a space characteristic-quality factor, and
wherein the collision probability represents a probability that channel collision occurs in a previous random access frame of a target communication node for random access or an average probability of occurrence of channel collision.

10. A method of performing random access by a User Equipment (UE) in a wireless communication system, the method comprising:
generating at least two random access signals having their own transmission priorities;
transmitting the at least two random access signals based on their own transmission priorities for completing a first-trial random access transmission, to at least two target communication nodes;
selecting at least one of random access response signals received in response to the at least two random access signals;
performing random access control for a first-time random access by using the selected at least one random access response signal,
wherein the generating a plurality of random access signals with their own transmission priorities comprises:
setting a transmission priority for each of the at least two random access signals based on random access conditions; and
setting at least one random access parameter in each of the at least two random access signals, according to the set transmission priority, wherein the at least one random access parameter set in the each of the at least two random access signals is different from each other,
wherein the selected random access response signals are selected depending on at least one of a Radio Access Technology (RAT), an expected Quality of Service (QoS), a signal strength, a transmission priority of random access signal, the number of random access response signals from the same Radio Access Technology (RAT), and the number of random access response signals from the same communication node, and
wherein the transmission priority of at least one random access signal of the at least two random access signals is different from the transmission priority of the rest of the at least two random access signals.

11. The method as claimed in claim 10, wherein, in the selecting of the at least one of the random access response signals received in response to the at least one random access signal, at least one random access response signal from each of at least two communications nodes is received, or at least two random access response signals from one communications node are received.

12. An apparatus for performing random access by a User Equipment (UE) in a wireless communication system, the apparatus comprising:
a multiple node random access controller including a non-transitory computer-readable medium that contains computer-executable instructions to control the UE to generate at least two random access signals having respective transmission priorities, transmit the at least two random access signals based on the respective transmission priorities for completing a first-trial random access transmission to at least two target communication node, select at least one of random access response signals received in response to the at least two random access signals, and performing random access control for a first-time random access by using the selected at least one random access response signal,
wherein the multiple node random access controller configured to:
set a transmission priority in each of the at least two random access signals based on random access conditions; and
set at least one random access parameter in each of the at least two random access signals according to the set transmission priority, wherein the at least one random access parameter set in the each of the at least two random access signals is different from each other,
wherein, the at least one of the at least two random access response signals are selected depending on at least one of a Radio Access Technology (RAT), an expected Quality of Service (QoS), a signal strength, a transmission priority of random access signal, the number of random access response signals from the same Radio Access Technology (RAT), and the number of random access response signals from the same communication node, and
wherein the transmission priority of at least one random access signal of the at least two random access signals is different from the transmission priority of the rest of the at least two random access signals.

13. The apparatus as claimed in claim 12, wherein the transmission priorities are determined based on at least one of Radio Access Technology (RAT) preference, a service charge, a neighbor list ranking, a channel condition, a bandwidth, a transmission rate, an error rate, an access condition, a type of a target RAT for random access, a type of a target communication node for random access, a bandwidth for use in random access, a distance between the UE and the target communication node for random access, a loading factor of the target communication node for random access, information on collided channels, and a collision probability,
wherein the channel condition includes at least one of a channel characteristic-quality factor and a space characteristic-quality factor,
wherein the collision probability represents a probability that channel collision occurs in a previous random access frame of a target communication node for random access or an average probability of occurrence of channel collision.

14. The apparatus as claimed in claim 12, wherein the multiple node random access controller including a non-transitory computer-readable medium that contains computer-executable instructions to control the UE to transmit the at least two random access signals to at least two communication nodes.

15. A method of performing random access by a User Equipment (UE) in a wireless communication system, the method comprising:
generating at least two random access signals having their own respective transmission priorities; and
transmitting, the at least two random access signals based on the respective transmission priorities for completing a first-trial random access transmission, to at least two target communication nodes,
wherein the generating a plurality of random access signals with the respective transmission priorities comprises:
setting a transmission priority in each of the at least two random access signals based on random access conditions; and
setting at least one random access parameter in each of the at least two random access signals according to the set transmission priority, wherein the at least one random access parameter set in the each of the at least two random access signals is different from each other,
wherein the transmission priorities are determined based on at least one of an available Radio Access Technology (RAT) type, the number of communication nodes available for each Radio Access Technology (RAT), availability for each communication node, and load for each communication node, and
wherein the transmission priority of at least one random access signal of the at least two random access signals is different from the transmission priority of the rest of the at least two random access signals.

16. An apparatus for performing random access by a User Equipment (UE) in a wireless communication system, the apparatus comprising:
a multiple node random access controller including a non-transitory computer-readable medium that contains computer-executable instructions to generate at least two random access signals having their own transmission priorities, and transmit the at least two random access signals based on their own transmission priorities for completing a first-trial random access transmission, to at least two target communication nodes,
wherein the multiple node random access controller configured to:
set a transmission priority in each of the at least two random access signals based on random access conditions; and
set at least one random access parameter in each of the at least two random access signals, according to the set transmission priority, wherein the at least one random access parameter set in the each of the at least two random access signals is different from each other,
wherein the transmission priority of at least one random access signal of the at least two random access signals is different from the transmission priority of the rest of the at least two random access signals.

17. The apparatus as claimed in claim 16,
wherein the transmission priorities are determined based on at least one of an available Radio Access Technology (RAT) type, the number of communication nodes available for each Radio Access Technology (RAT), availability for each communication node, and load for each communication node.

18. The apparatus as claimed in claim 16, wherein the transmission priorities are determined in consideration of at least one of Radio Access Technology (RAT) preference, a service charge, a neighbor list ranking, a channel condition, a bandwidth, a transmission rate, an error rate, an access condition, a type of a target RAT for random access, a type of a target communication node for random access, a bandwidth for use in random access, a distance between the UE and the target communication node for random access, a loading factor of the target communication node for random access, information on collided channels, and a collision probability,
wherein the channel condition includes at least one of a channel characteristic-quality factor and a space characteristic-quality factor, and
wherein the collision probability represents a probability that channel collision occurs in a previous random access frame of a target communication node for random access or an average probability of occurrence of channel collision.

\* \* \* \* \*